United States Patent
Hayashi

(10) Patent No.: US 12,360,309 B2
(45) Date of Patent: Jul. 15, 2025

(54) MULTI-CORE OPTICAL FIBER AND MULTI-CORE OPTICAL FIBER CABLE

(71) Applicant: SUMITOMO ELECTRIC INDUSTRIES, LTD., Osaka (JP)

(72) Inventor: Tetsuya Hayashi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 236 days.

(21) Appl. No.: 18/106,634

(22) Filed: Feb. 7, 2023

(65) Prior Publication Data

US 2023/0185017 A1 Jun. 15, 2023

Related U.S. Application Data

(63) Continuation-in-part of application No. 17/494,090, filed on Oct. 5, 2021, now Pat. No. 11,604,312.

(30) Foreign Application Priority Data

Oct. 9, 2020 (JP) ................. 2020-171407

(51) Int. Cl.
*G02B 6/02* (2006.01)
*G02B 6/036* (2006.01)
*G02B 6/028* (2006.01)

(52) U.S. Cl.
CPC ...... *G02B 6/02042* (2013.01); *G02B 6/03611* (2013.01); *G02B 6/0281* (2013.01); *G02B 6/03627* (2013.01); *G02B 6/0365* (2013.01)

(58) Field of Classification Search
CPC .......................... G02B 6/02042; G02B 6/03611
See application file for complete search history.

(56) References Cited

U.S. PATENT DOCUMENTS 9,081,129 B2 * 7/2015 Matsuo ............. G02B 6/02042
9,244,217 B2 * 1/2016 Sasaoka ............. G02B 6/4246
(Continued)

FOREIGN PATENT DOCUMENTS

JP 2013-106135 A 5/2013
JP 2022-041625 A 3/2022
(Continued)

OTHER PUBLICATIONS

Sasaki Yusuke et al., "Few-Mode Multicore Fiber With 36 Spatial Modes," Journal of Lightwave Technology, vol. 33, No. 5, Mar. 1, 2015, p. 964-p. 970, XP011575197.
(Continued)

*Primary Examiner* — Ryan A Lepisto
(74) *Attorney, Agent, or Firm* — Faegre Drinker Biddle & Reath LLP

(57) ABSTRACT

The MCF of the present disclosure suppresses XT and leakage loss at 1.565 μm or 1.625 μm for bidirectional communication. The MCF comprises 12 core units each including a core and a depressed layer, a common cladding, and a resin coating. The units are arranged so that no adjacent relationship is established between cores each having an adjacent relationship with a specific core selected from the units, and are arranged so that centers of the units are line symmetric with a symmetry axis intersecting with the central axis and passing through none of the centers of the units. The resin coating's diameter is 250±15 μm, an effective area at 1.550 μm is 70 μm$^2$ or more, and a 22 m-length cable cutoff wavelength is 1.530 μm or less. A center-to-center interval between adjacent cores, a shortest distance from the core center to the cladding interface, and a cladding's diameter satisfy specific conditions.

8 Claims, 17 Drawing Sheets

(56) References Cited

U.S. PATENT DOCUMENTS

| | | | |
|---|---|---|---|
| 9,400,351 B2* | 7/2016 | Takenage | G02B 6/03605 |
| 9,423,559 B2* | 8/2016 | Tsuchida | G02B 6/02042 |
| 9,588,284 B2* | 3/2017 | Sasaki | G02B 6/02219 |
| 9,817,183 B2* | 11/2017 | Amma | G02B 6/02042 |
| 9,891,378 B2* | 2/2018 | Imamura | C03B 37/01222 |
| 10,042,114 B2* | 8/2018 | Takenaga | G02B 6/02366 |
| 2013/0129292 A1 | 5/2013 | Sasaoka et al. | |
| 2016/0209583 A1 | 7/2016 | Hayashi et al. | |
| 2022/0066091 A1 | 3/2022 | Hayashi et al. | |

FOREIGN PATENT DOCUMENTS

| | | |
|---|---|---|
| WO | WO-2016/063800 A1 | 4/2016 |
| WO | WO-2016/084465 A1 | 6/2016 |

OTHER PUBLICATIONS

Black, R. J. and Pask C., "Developments in the theory of equivalent-step-index fibers," J. Opt. Soc. Am. A, JOSAA 1(11), 1984, pp. 1129-1131.

Matsui, Takashi et al., "Zero-Dispersion Wavelength Optimized Single-Mode Multi-Core Fiber for Hight-Speed Gigabit Ethernet," Eur. Conf. Opt. Commun. (ECOC), 2017, pW.1.B.2.

Sasaki, Y. et al., "Asymmetrically Arranged 8-core Fibers with Center Core Suitable for Side-view Alignment in Datacenter Networks," OFC 2020, 2020, pT4J.1.

Sasaki, Yusuke et al., "High Density Multicore Fibers Employing Small MFD Cores for Datacenters," OECC 2018, Technical Digest, Jeju, Korea., Jul. 2-6, 2018, p. 2-p. 07.

\* cited by examiner

Fig. 17

| PARAMETER | | UNIT | a | b | c | $A_{eff, 1550}$ | $\lambda_{cc}$ | $\Delta_{core}$ | $\Delta_{dep}$ | $\Lambda$ | NUMBER OF CORES | $d_{coat}$ | $\theta_0$ | CD | XT AT 1.565μm | XT AT 1.625μm | LEAKAGE LOSS AT 1.565μm | LEAKAGE LOSS AT 1.625μm |
|---|---|---|---|---|---|---|---|---|---|---|---|---|---|---|---|---|---|---|
| | | | μm | μm | μm | μm² | μm | % | % | μm | | μm | deg | | 1/km | 1/km | dB/km | dB/km |
| EMBODIMENT | SAMPLE 1 | | 4.66 | 4.66 | 9.32 | 78 | 1.404 | 0.39 | 0.1 | 37 | 12 | 30.72 | 86 | 180.0 | 3.37×10⁻⁰⁴ | 1.30×10⁻⁰³ | 0.0065 | 0.0160 |
| | SAMPLE 2 | | 5.18 | 5.18 | 15.54 | 110 | 1.443 | 0.27 | 0.15 | 36 | 12 | 32.32 | 86 | 180.0 | 3.34×10⁻⁰⁴ | 1.09×10⁻⁰³ | 0.0026 | 0.0078 |
| | SAMPLE 3 | | 5.18 | 5.18 | 10.36 | 78 | 1.382 | 0.39 | 0.15 | 37 | 12 | 30.72 | 86 | 180.0 | 1.65×10⁻⁰⁴ | 6.51×10⁻⁰⁴ | 0.0042 | 0.0105 |
| | SAMPLE 4 | | 5.07 | 7.68 | 15.09 | 80 | 1.5 | 0.36 | 0.45 | 35 | 12 | 33.92 | 86 | 180.0 | 6.51×10⁻⁰⁷ | 2.72×10⁻⁰⁶ | ≦0.0005 | ≦0.0005 |
| COMPARATIVE EXAMPLE | SAMPLE 1 | | 5.25 | 5.25 | 5.25 | 78 | 1.212 | 0.36 | 0 | 41.0 | 12 | 34.82 | 90 | 199.2 | 1.00×10⁻⁰³ | >1.00×10⁻⁰³ | 0.01 | >0.01 |
| | SAMPLE 2 | | 4.66 | 4.66 | 9.32 | 110 | 1.356 | 0.27 | 0.1 | 40.5 | 12 | 35.45 | 90 | 198.9 | 1.00×10⁻⁰³ | >1.00×10⁻⁰³ | 0.01 | >0.01 |
| | SAMPLE 3 | | 4.66 | 4.66 | 9.32 | 110 | 1.356 | 0.27 | 0.1 | 40.5 | 12 | 35.45 | 90 | 198.9 | 1.00×10⁻⁰³ | >1.00×10⁻⁰³ | 0.01 | >0.01 |
| | SAMPLE 4 | | 5.18 | 5.18 | 10.36 | 78 | 1.382 | 0.39 | 0.15 | 37 | 16 | 31.50 | 90 | 220.0 | 1.65×10⁻⁰⁴ | 6.51×10⁻⁰⁴ | 0.0023 | 0.0061 |
| | SAMPLE 5 | | 5.07 | 7.68 | 15.09 | 80 | 1.5 | 0.36 | 0.45 | 35 | 16 | 34.66 | 90 | 217.8 | 6.51×10⁻⁰⁷ | 2.72×10⁻⁰⁶ | ≦0.0005 | ≦0.0005 |

MULTI-CORE OPTICAL FIBER AND MULTI-CORE OPTICAL FIBER CABLE

CROSS-REFERENCE OF RELATED APPLICATIONS

This application is a Continuation-In-Part application of the patent application Ser. No. 17/494,090 filed on Oct. 5, 2021 by the same Applicant.

TECHNICAL FIELD

The present disclosure relates to a multi-core optical fiber (hereinafter, referred to as an "MCF") and a multi-core optical fiber cable (hereinafter, referred to as an "MCF cable").

The present application claims priority from Japanese Patent Application No. 2020-171407 filed on Oct. 9, 2020, which is based on the contents and all of which are incorporated herein by reference in their entirety.

BACKGROUND

Patent Document 1 discloses an MCF applicable to bidirectional communication.

Non-Patent Document 1 discloses an eight-core fiber including a center core and seven cores arranged in an annular shape around the center core. Note that in this eight-core fiber, the seven cores arranged around the center core in an annular shape are arranged such that some of center-to-center-to-center intervals (core intervals) between adjacent cores are different.

Non-Patent Document 2 discloses a 12-core fiber including a cladding having an outer diameter of 147 μm and 12 cores arranged such that a core arrangement defined on a fiber cross-section constitutes a square lattice, and a 12-core fiber including a cladding having an outer diameter of 145 μm and 12 cores arranged such that a core arrangement defined on a fiber cross-section constitutes a hexagonal lattice. Neither of the 12-core fibers has a trench structure. A mode field diameter (hereinafter, referred to as an "MFD") in each core is 5.4 μm at a wavelength of 1310 nm and 6.1 μm at a wavelength of 1550 nm. The cutoff wavelength is 1.26 μm. The zero-dispersion wavelength in each core is 1.41 μm. The leakage loss from the cladding to a coating at a wavelength of 1565 nm is 0.01 dB/2 km. A crosstalk (hereinafter, referred to as an "XT") between the cores at the wavelength of 1565 nm is −30 dB/2 km.

Patent Document 1: Japanese Patent Application Laid-Open No. 2013-106135 (Japanese Patent No. 5842556)
Patent Document 2: Japanese Patent Application Laid-Open No. 2022-41625
Patent Document 3: Japanese Patent Application Laid-Open No. 2015-163972
Non-Patent Document 1: Y. Sasaki, et al., "Asymmetrically Arranged 8-core Fibers with Center Core Suitable for Side-view Alignment in Datacenter Networks", OFC2020, T4J.1.
Non-Patent Document 2: Yusuke Sasaki, et al., "High Density Multicore Fibers Employing Small MFD Cores for Datacenters", OECC2018, Technical Digest, P2-07, Jul. 2-6, 2018, Jeju, Korea.
Non-Patent Document 3: R. J. Black and C. Pask, J. Opt. Soc. Am. A, JOSAA 1(11), 1129-1131 (1984).
Non-Patent Document 4: Matsui et al., in Eur. Conf. Opt. Commun. (ECOC) (2017), p. W.1.B.2.

SUMMARY

An MCF according to the present disclosure includes 12 cores each extending along a central axis, and a common cladding covering each of the 12 cores. In particular, the common cladding has an outer periphery that is circular on a cross-section of the MCF, the cross-section being orthogonal to the central axis. On the cross-section, the 12 cores are arranged such that no adjacent relationship is established between cores each having an adjacent relationship with any core. In addition, the 12 cores are respectively arranged such that centers of the 12 cores are line symmetric with respect to an axis as a symmetry axis that intersects with the central axis and that passes through none of the centers of the 12 cores. Furthermore, on the cross-section, an arrangement of the centers of the 12 cores has rotational symmetry at most once with any point being a center of rotation.

BRIEF DESCRIPTION OF THE DRAWINGS

FIG. 17 is a table showing specifications of various samples of the embodiment according to the MCF of the present disclosure and various samples of the comparative example.

DETAILED DESCRIPTION

Figure 1:
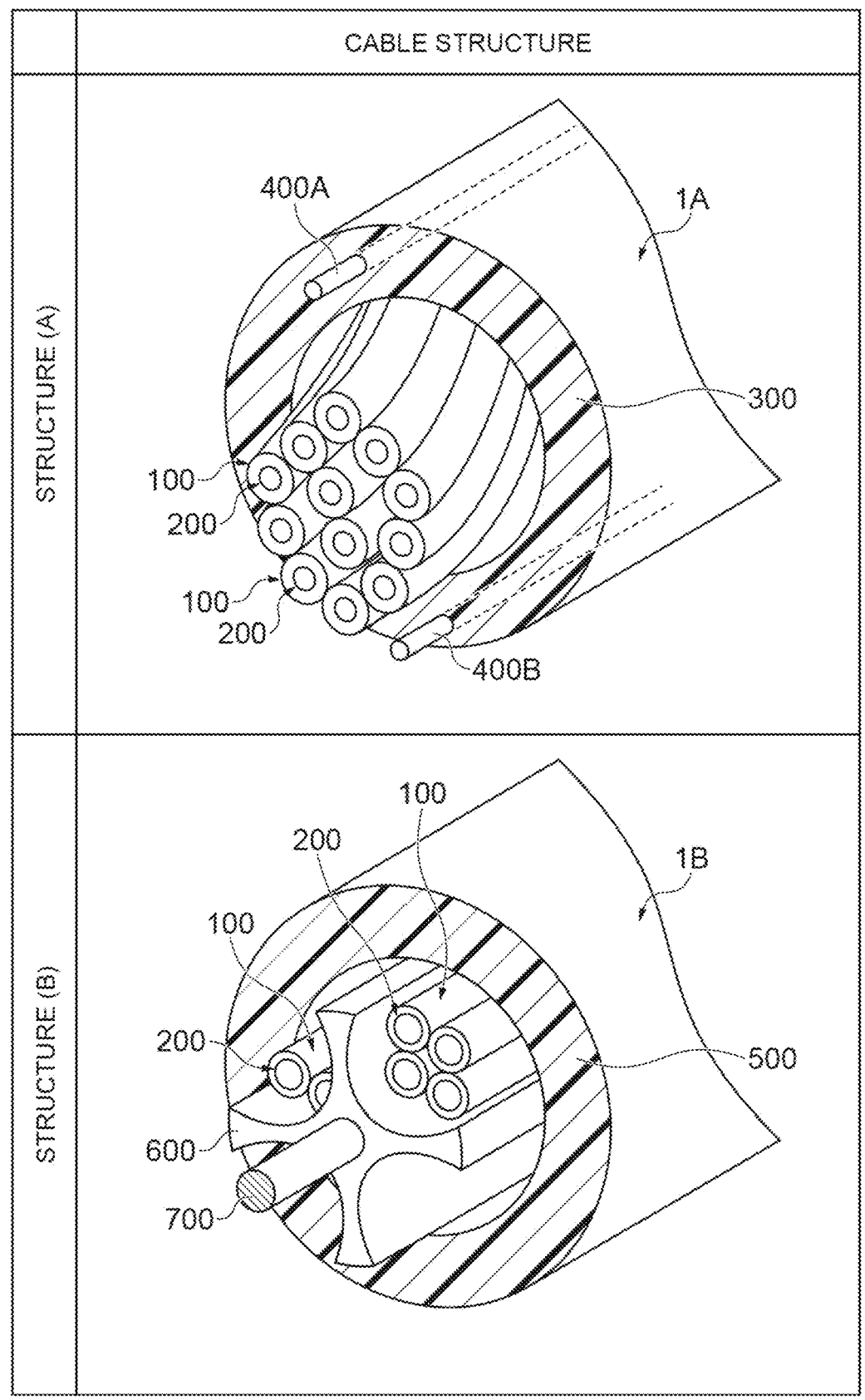
FIG. 1 is a diagram illustrating various structures of an MCF cable (including an MCF according to the present disclosure) according to the present disclosure.

Problems to be Solved by the Present Disclosure

The inventor has studied the above-described conventional techniques and found the following problems. That is, the core arrangements in the MCFs disclosed in Patent Document 1 to Non-Patent Document 2 have each rotational symmetry twice or more, and thus a marker is needed for identifying the cores. In addition, there is no line symmetry in the core arrangement, or a core is present on a symmetry axis even in a case where the cores are line symmetric. Hence, regarding splicing between the MCFs, it is necessary to consider the polarity (a state in which the core to be spliced is designated for each core) in a transmission link. For example, in taking an example of a multi-core connector in which an even number of optical fiber ribbons are mounted, in a case where a half of optical fibers from the left are used as transmission optical fibers and a half of the optical fibers from the right are used as reception optical fibers, it is not necessary to change the configuration at either end, or a polarity problem does not occur. However, for example, in the case of an MCF including a core in the cladding center, and the core in the cladding center is set for transmission at one end, it is necessary to set the core for reception at the other end, and it is necessary to establish a splicing and link configuration in consideration of the polarity (it is necessary to use fan-in and fan-out with different configurations at both ends, or to use transceivers with different configurations). Furthermore, the MFD at the wavelength of 1310 nm is very small, and hence a bending loss increases.

The present disclosure has been made to solve the above-described problems, and has an object to provide an MCF fiber that is usable for short-haul O-band transmission, that has a standard coating diameter of an MFD almost the same as that of a general-purpose SMF, that is capable of splicing fibers without either a marker or a polarity, and that includes 12 cores usable for counter propagation.

Descriptions of Embodiments of the Present Disclosure

First, contents in embodiments of the present disclosure will be individually listed and described.

(1) According to one aspect of the present disclosure, an MCF includes 12 cores each extending along a central axis, and a common cladding covering each of the 12 cores. In particular, the common cladding has an outer periphery that is circular on a cross-section of the MCF, the cross-section being orthogonal to the central axis. On the cross-section, the 12 cores are arranged such that no adjacent relationship is established between cores each having an adjacent relationship with any core. In addition, the 12 cores are respectively arranged such that centers of the 12 cores are line symmetric with respect to an axis as a symmetry axis that intersects with the central axis and that passes through none of the centers of the 12 cores. Furthermore, on the cross-section, an arrangement of the centers of the 12 cores has rotational symmetry at most once with any point being a center of rotation. In other words, on the cross-section, the arrangement of the centers of the 12 cores is the same as that of itself, only in a case where the cores are rotated by 360 degrees, even if the cores are rotated around any point.

As described above, in the MCF, the 12 cores are included in the common cladding, and thus this structure enables splicing of the number of cores as many as 12-fiber ribbons or more per fusion. In addition, the outer periphery shape of the common cladding (defined by the cross-section of the MCF) is circular, and thus the core arrangement suitable for the counter propagation is achievable. The 12 cores are arranged such that no adjacent relationship is established between cores each having the adjacent relationship with any core, and thus the same type of MCFs can be spliced to each other at either end face without a polarity (a combination of transmission directions of optical signals set for the respective cores). Further, the 12 cores are respectively arranged such that centers of the 12 cores are line symmetric with respect to an axis as a symmetry axis that intersects with the central axis and that passes through none of the centers of the 12 cores. This enables core identification and comparison without a marker.

(2) According to one aspect of the present disclosure, the 12 cores are each classified into either an inner core or an outer core as follows. Specifically, the 12 cores include four inner cores respectively allocated to four inner lattice points, and eight outer cores respectively allocated to eight outer lattice points, with respect to a square lattice having a lattice point interval $\Lambda_{nominal}$, the square lattice including the four inner lattice points constituting a smallest square, and the eight outer lattice points surrounding the four inner lattice points and each establishing an adjacent relationship with any of the four inner lattice points, the square lattice being set on the cross-section such that distances from the central axis to the four inner lattice points are equal to one another. In other words, the four inner cores each have the adjacent relationship with two outer cores of the eight outer cores. In addition, a distance between each of the center positions of the four inner cores and a corresponding inner lattice point of the four inner lattice points is 0.5 µm or less. On the other hand, the eight outer cores each belong to either a lattice point arranged core or a lattice point unarranged core. The lattice point arranged core is a core having a center arranged at a position with a distance of 0.5 µm or less to a corresponding outer lattice point of the eight outer lattice points. In addition, the lattice point unarranged core is a core having a center arranged at a position separated from the corresponding outer lattice point by more than 2 µm. A ratio of the number of the lattice point arranged cores to the number of the lattice point unarranged cores is preferably any one of 2 to 6, 4 to 4, or 6 to 2. Centers of the lattice point unarranged cores are each arranged at a position separated by a value of $\Lambda_{nominal}-0.5$ µm or more and $\Lambda_{nominal}+0.5$ µm or less from a specific inner lattice point having the adjacent relationship with the corresponding outer lattice point of the four inner lattice points. The centers of the lattice point unarranged cores are each arranged such that a distance from a specific outer lattice point having the adjacent relationship with the corresponding outer lattice point is longer than a distance from the corresponding specific inner lattice point, and are each separated from a center of any remaining outer core by $\Lambda_{nominal}+3$ µm or more.

The four inner cores are each disposed such that its center is located at a position having a distance of 0.5 µm or less to the corresponding inner lattice point. Accordingly, the four inner cores are arranged in a square, and it is possible to avoid the outer cores from being excessively separated from the center position of the common cladding (becoming closer to the coating), while maintaining the center-to-center interval $\Lambda$ between the cores having the adjacent relationship at a certain value or more. In addition, the center of the lattice point unarranged core is separated from the corresponding outer lattice point by 2 µm or more, and thus enables sufficient asymmetry with respect to the core arrangement in the MCF (defined on the cross-section of the MCF). The centers of the lattice point unarranged cores are each arranged such that a distance from a specific outer lattice point (another outer lattice point that establishes the adjacent relationship with the corresponding outer lattice point) is longer than a distance from the corresponding outer lattice point. In this case, the core arrangement in which the eight outer cores are not close to one another is achievable. Furthermore, centers of the lattice point unarranged cores are each separated from a center of any remaining lattice point unarranged cores by $\Lambda_{nominal}+3$ µm or more. In this case, the outer core having the adjacent relationship with any inner core and another outer core having the adjacent relationship with such any inner core becomes too close to each other, whereas a sufficient distance is ensured so that the adjacent relationship should not be established between these two outer cores.

(3) According to one aspect of the present disclosure, the lattice point unarranged cores are each arranged such that an angle θ formed by a line segment connecting the corresponding outer lattice point and the specific inner lattice point and a line segment connecting the center of the lattice point unarranged core and the specific inner lattice point is equal to or more than three degrees and equal to or less than 30 degrees, is equal to or more than three degrees and equal to or less than 25 degrees, or is equal to or more than three degrees and equal to or less than 20 degrees. In this case, while asymmetry with respect to the core arrangement in the MCF is being kept, the outer core having the adjacent relationship with any inner core and another outer core having the adjacent relationship with such any inner core are prevented from becoming too close to each other (a sufficient distance is ensured so that the adjacent relationship should not be established between these two outer cores).

(4) According to one aspect of the present disclosure, the number of the lattice point unarranged cores is two, and two outer lattice points to which the lattice point unarranged cores are respectively allocated establish the adjacent relationship with each other. Note that in this case, the two outer cores having the adjacent relationship with each other respectively have adjacent relationships with different inner cores. The lattice point unarranged core arranged in this manner is farther from the center of the common cladding (the central axis) (is farther as θ becomes larger) than the lattice point arranged core, and an outer cladding thickness (OCT) is degraded (becomes smaller). Alternatively, it is necessary to increase the outer diameter of the common cladding in order to suppress the degradation of the OCT. On the other hand, in the configuration according to the present aspect, the center-to-center interval of a case where the two outer cores are each the lattice point unarranged core can be separated even more with a small θ compared to the center-to-center interval of a case where one of the two outer cores respectively allocated to the two outer lattice points having the adjacent relationship with each other is the lattice point unarranged core. As a result, the visibility of the asymmetry of the core arrangement in the MCF is enhanced even with the small θ.

(5) According to one aspect of the present disclosure, a resin coating covering the outer periphery of the common cladding and having an outer diameter that falls within a range of 235 µm or more and 265 µm or less with 250 µm used as a reference may be further included. With respect to a predetermined cladding diameter nominal value $CD_{nominal}$ [µm] of 195 µm or less, with $CD_{nominal}$ used as a reference, a diameter CD of the common cladding falls within a range of a value of $CD_{nominal}-1$ µm or more and a value of $CD_{nominal}+1$ µm or less, a cable cutoff wavelength $\lambda_{cc}$ in each of the 12 cores measured on a 22-m length of fiber is equal to or less than 1260 nm or is equal to or less than 1360 nm, a zero-dispersion wavelength in each of the 12 cores falls within a range of a value of a wavelength reference value−12 nm or more and a value of the wavelength reference value+12 nm or less with a value of a range of 1312 nm or more and 1340 nm or less used as a wavelength reference value, and a dispersion slope of each of the 12 cores at the zero-dispersion wavelength is equal to or less than 0.092 ps/(nm²·km) at a wavelength of 1310 nm. Further, in each of the 12 cores, with respect to a ratio of an MFD [µm] to the cable cutoff wavelength $\lambda_{cc}$ [µm] at a wavelength of 1310 nm, a shortest distance $d_{coat}$ [µm] (that means the same as the above OCT) from a core center in the 12 cores to an interface between the resin coating and the common cladding (hereinafter, referred to as "coating-cladding interface") satisfies a relationship in the following Formula (1):

$$d_{coat} \geq 2.88 MFD/\lambda_{cc}+5.36 \tag{1}$$

Further, the MCF satisfies the following first condition or second condition.

Note that in the first condition, in each of the 12 cores, a total crosstalk from a core having the adjacent relationship with a target core to the target core at a wavelength of 1360 nm is equal to or less than −6.7 dB/10 km, and a center-tocenter interval Λ [μm] between cores having the adjacent relationship among the 12 cores is defined by satisfying the following Formula (2):

$$\Lambda \geq 2.34 MFD/\lambda_{cc} + 12.1 \quad (2),$$

and the cladding diameter nominal value $CD_{nominal}$ [μm] is defined by satisfying the following Formula (3):

$$CD_{nominal} \geq 13.15 MFD/\lambda_{cc} + 54.25 \quad (3).$$

In the second condition, in each of the 12 cores, the total crosstalk at the wavelength of 1360 nm from the core having the adjacent relationship with the target core to the target core is equal to or less than −16.7 dB/10 km, the center-to-center interval Λ [μm] between the cores having the adjacent relationship is defined by satisfying the following Formula (4):

$$\Lambda \geq 2.73 MFD/\lambda_{cc} + 12.7 \quad (4),$$

and the cladding diameter nominal value $CD_{nominal}$ [μm] is defined by satisfying the following Formula (5):

$$CD_{nominal} \geq 14.07 MFD/\lambda_{cc} + 55.59 \quad (5).$$

With this configuration, an MCF excellent in mass productivity and capable of effectively suppressing increases in splice cost and transmission loss is obtainable.

(6) According to one aspect of the present disclosure, preferably, the 12 cores include four cores surrounding the central axis at the shortest distance, the MFD [μm] falls within a range of 8.2 μm or more and 9.0 μm or less with 8.6 μm used as a reference, and the cable cutoff wavelength $\lambda_{cc}$ is equal to or less than 1260 nm. In addition, the MFD [μm] and the cable cutoff wavelength $\lambda_{cc}$ [μm] preferably satisfy any one of the relationships in the following Formulas (6) to (10):

$$6.5 \leq MFD/\lambda_{cc} \leq 7.5 \leq 0.07606 CD_{nominal} - 4.126 \quad (6);$$

$$6.5 \leq MFD/\lambda_{cc} \leq 8.0 \leq 0.07606 CD_{nominal} - 4.126 \quad (7);$$

$$6.5 \leq MFD/\lambda_{cc} \leq 8.4 \leq 0.07606 CD_{nominal} - 4.126 \quad (8);$$

$$6.5 \leq MFD/\lambda_{cc} \leq 9.0 \leq 0.07606 CD_{nominal} - 4.126 \quad (9); \text{ and}$$

$$6.5 \leq MFD/\lambda_{cc} \leq 9.5 \leq 0.07606 CD_{nominal} - 4.126 \quad (10).$$

In this case, an MCF excellent in mass productivity and capable of effectively suppressing increases in splice cost and transmission loss is obtainable.

(7) According to one aspect of the present disclosure, the 12 cores include four cores surrounding the central axis at the shortest distance, and the total crosstalk of any core (substantially, a predetermined inner core) of the four cores at the wavelength of 1360 nm is equal to or less than −16.7 dB/10 km, the MFD falls within a range of 7.8 μm or more and 8.6 μm or less with 8.2 μm used as a reference, and the cable cutoff wavelength $\lambda_{cc}$ is equal to or less than 1260 nm. In addition, the MFD [μm] and the cable cutoff wavelength $\lambda_{cc}$ [μm] preferably satisfy any one of the relationships in the following Formulas (11) to (15):

$$6.2 \leq MFD/\lambda_{cc} \leq 7.2 \leq 0.07105 CD_{nominal} - 3.950 \quad (11);$$

$$6.2 \leq MFD/\lambda_{cc} \leq 7.7 \leq 0.07105 CD_{nominal} - 3.950 \quad (12);$$

$$6.2 \leq MFD/\lambda_{cc} \leq 8.1 \leq 0.07105 CD_{nominal} - 3.950 \quad (13);$$

$$6.2 \leq MFD/\lambda_{cc} \leq 8.7 \leq 0.07105 CD_{nominal} - 3.950 \quad (14); \text{ and}$$

$$6.2 \leq MFD/\lambda_{cc} \leq 9.2 \leq 0.07105 CD_{nominal} - 3.950 \quad (15).$$

In this case, an MCF excellent in mass productivity and capable of effectively suppressing increases in splice cost and transmission loss is obtainable.

(8) According to one aspect of the present disclosure, the 12 cores include four cores surrounding the central axis at the shortest distance, and the total crosstalk of any core (substantially, a predetermined inner core) of the four cores at the wavelength of 1360 nm is equal to or less than −16.7 dB/10 km, the MFD falls within a range of 8.2 μm or more and 9.0 μm or less with 8.6 μm used as a reference, and the cable cutoff wavelength $\lambda_{cc}$ is equal to or less than 1360 nm. Further, the MFD [μm] and the cable cutoff wavelength $\lambda_{cc}$ [μm] preferably satisfy any one of the relationships in the following Formulas (16) to (20):

$$6.0 \leq MFD/\lambda_{cc} \leq 7.0 \leq 0.07105 CD_{nominal} - 3.950 \quad (16);$$

$$6.0 \leq MFD/\lambda_{cc} \leq 7.5 \leq 0.07105 CD_{nominal} - 3.950 \quad (17);$$

$$6.0 \leq MFD/\lambda_{cc} \leq 7.9 \leq 0.07105 CD_{nominal} - 3.950 \quad (18);$$

$$6.0 \leq MFD/\lambda_{cc} \leq 8.5 \leq 0.07105 CD_{nominal} - 3.950 \quad (19); \text{ and}$$

$$6.0 \leq MFD/\lambda_{cc} \leq 9.0 \leq 0.07105 CD_{nominal} - 3.950 \quad (20).$$

In this case, an MCF excellent in mass productivity and capable of effectively suppressing increases in splice cost and transmission loss is obtainable.

(9) An MCF cable according to one aspect of the present disclosure includes a plurality of MCFs including the MCF having the above-described structure. In addition, the MCF cable according to the present disclosure may incorporate a multi-core optical fiber ribbon in which these plurality of MCFs are intermittently bonded. The MCF cable according to one aspect of the present disclosure may incorporate the multi-core optical fiber ribbon with spirally twisted. The MCF cable according to one aspect of the present disclosure may include the MCF having an average bending radius of 0.03 m or more and 0.14 m or less, or 0.14 m or more and 0.3 m or less in a fiber longitudinal direction. Any of the configurations enables a significant increase in transmission capacity.

Heretofore, each aspect listed in the section of [Descriptions of Embodiments of the Present Disclosure] is applicable to each of all the remaining aspects or to all combinations of these remaining aspects.

Details of Embodiments of the Present Disclosure

Specific examples of a multi-core optical fiber (MCF) and a multi-core optical fiber cable (MCF cable) according to the present disclosure will be described in detail below with reference to the accompanying drawings. Note that the present disclosure is not limited to these examples, but is indicated by the claims, and is intended to include all modifications within the meaning and scope equivalent to the claims. In addition, in the description of the drawings, the same elements are denoted by the same reference numerals, and duplicated descriptions will be omitted.

FIG. 1 is a diagram illustrating various structures of an MCF cable (including an MCF according to the present disclosure) according to the present disclosure.

An MCF cable 1A having a structure (A) includes an outer sheath 300 including an MCF accommodation space extending in a longitudinal direction of the MCF cable 1A, and a plurality of MCFs 100 (MCFs according to the present disclosure). In the outer sheath 300, two tensile strength lines (tension members) 400A and 400B extending along the MCF accommodation space are embedded. The MCFs 100 each includes a glass fiber 200, the outer periphery surface of which is covered with a resin coating. Note that the MCF 100 can constitute an intermittently bonded MCF ribbon, and in this case, the MCF ribbon is incorporated into the MCF cable 1A with spirally twisted.

On the other hand, an MCF cable 1B having a structure (B) includes an outer sheath 500 including an MCF accommodation space extending in a longitudinal direction of the MCF cable 1B, a slotted core 600 that divides the MCF accommodation space into a plurality of spaces, and a plurality of MCFs 100 (MCFs according to the present disclosure). The slotted core 600 that divides the MCF accommodation space into the plurality of spaces is accommodated inside the outer sheath 500. A tensile strength line 700 extending in a longitudinal direction of the MCF cable 1B is embedded in the slotted core 600. The plurality of MCFs 100 are accommodated in any one of the spaces divided by the slotted core 600.

Figure 2:
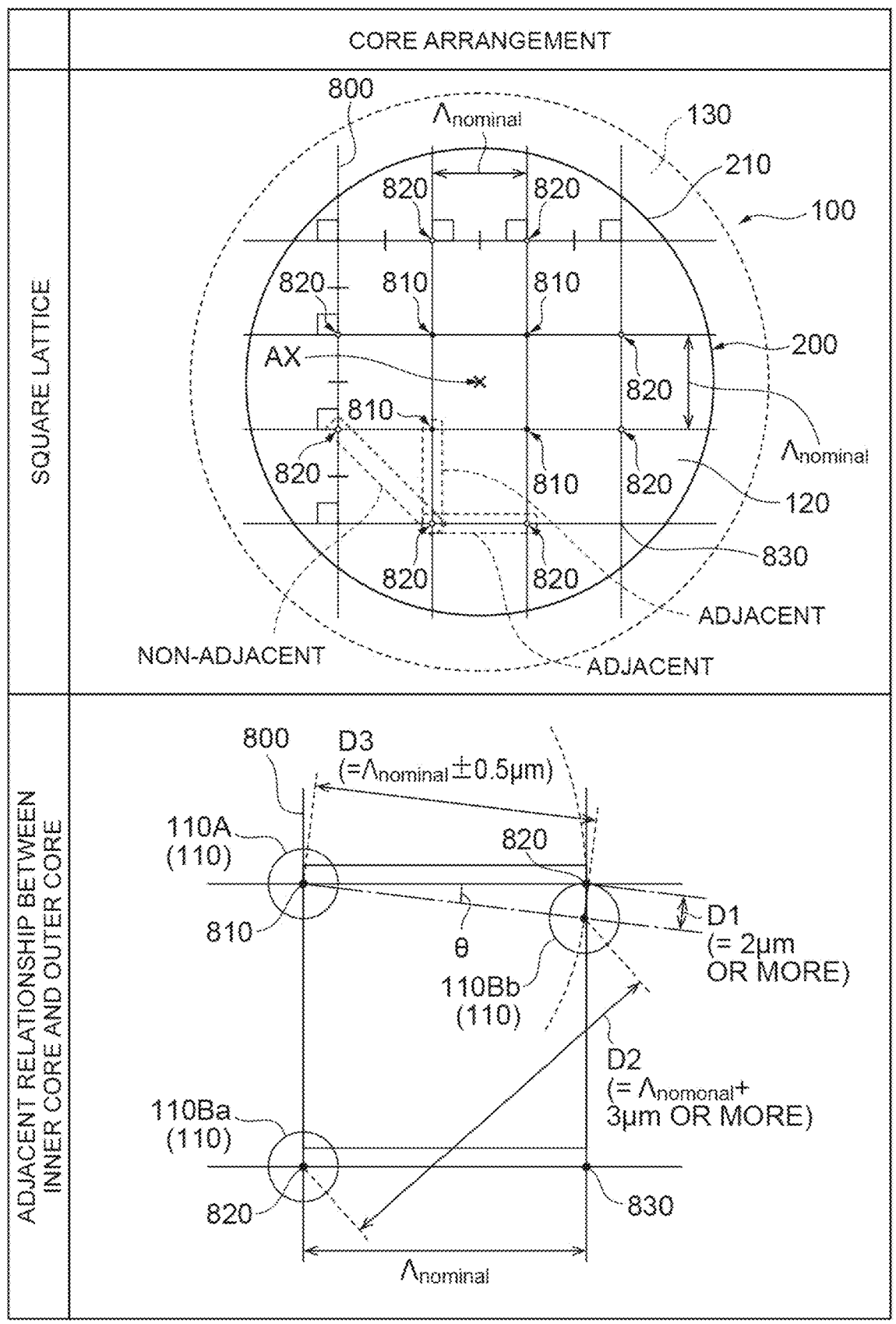
FIG. 2 is a diagram for describing various conditions for determining a core arrangement in the MCF according to the present disclosure.

FIG. 2 is a diagram for describing various conditions for determining a core arrangement in the MCF according to the present disclosure. In an upper part of FIG. 2, a square lattice 800 defined on a cross-section of the MCF 100 is illustrated, and in a lower part, a diagram for describing an arrangement state of two outer cores in which an adjacent relationship is maintained with respect to one inner core is illustrated.

The MCF according to the present disclosure preferably includes 12 cores. Accordingly, even in a case where the rotational alignment is performed on the MCFs one by one and the fusion is performed, the number of the cores to be spliced per fusion can be made equal to that of ribbon fusion (12-fiber batch fusion) in a cable incorporating a large number of 12-fiber ribbons, in splicing a great number of core cables.

In addition, the MCF according to the present disclosure preferably has a core arrangement in which a plurality of cores each having an adjacent relationship with a predetermined core do not have the adjacent relationship. Accordingly, in bidirectional communication on which signals are transmitted in different propagation directions between the cores having the adjacent relationship (hereinafter, referred to as an "adjacent core"), it is possible to reduce the XT (the counter propagation XT) to an adjacent core of the predetermined core, and from another core having the adjacent relationship to the predetermined core. Here, the adjacent core of the predetermined core means, as will be described later (see FIG. 7), a core having a large influence of the parallel propagation XT (a general XT in the case of propagating light in an identical direction) to the predetermined core. To be specific, the adjacent core corresponds to a core having a center-to-center interval between the cores is closest to the predetermined core and a core having a center-to-center interval almost the same as that (the difference is 2 µm or less).

As an example, like the example of FIG. 2, the 12 cores are preferably arranged so as to have a core arrangement similar to a square lattice in which some of the 12 cores are shifted from lattice points (adjacent cores each having an adjacent relationship with any core do not establish the adjacent relationship). In this situation, on the cross-section of the MCF, the centers of the respective cores are preferably arranged at positions to be line symmetric with respect to a predetermined axis as a symmetry axis that passes through the center (fiber axis) of the common cladding and that does not pass through the centers of the respective cores. This arrangement enables a predetermined end portion of one MCF to be spliced to any end portion of another MCF without being conscious of "polarity" at the time of MCF splicing. The core arrangement in the MCF according to the present disclosure preferably has rotational symmetry once (does not have the rotational symmetry twice or more). This arrangement makes it possible to understand individual cores without adding a "marker" other than the cores.

Further, in FIG. 2, no consideration is given to variations in the core position, but the core position (the center of the core) may vary within 0.5 µm from a predetermined lattice point. This configuration enables a large increase in manufacturing tolerance. In an actual MCF, the positions of the lattice points to which inner cores and outer cores are allocated (inner lattice points and outer lattice points) can be obtained by optimizing a lattice point interval, an orientation, and a position of the square lattice so as to minimize the sum of square errors of the positional shifts of the lattice points respectively corresponding to the centers of the cores. Alternatively, a nominal value (a design value) may be used for the lattice point interval of the square lattice, so the orientation and the position of the square lattice may be optimized.

Specifically, the MCF 100 illustrated in FIG. 2 includes a glass fiber 200 extending along the central axis (a fiber axis AX) and a resin coating 130, which covers the glass fiber 200. The glass fiber 200 includes 12 cores 110 each extending along the fiber axis AX, and a common cladding 120, which covers each of the 12 cores.

The square lattice 800 as a reference of the core arrangement illustrated in the upper part of FIG. 2 is defined on a cross-section, which is orthogonal to the fiber axis AX, of the MCF 100. Note that the shape of an outer periphery 210 of the common cladding 120 (defined on the cross-section of the MCF 100) is circular. That is, the square lattice 800 is a square lattice having a lattice point interval $\Lambda_{nominal}$, and is constituted of a plurality of lattice points arranged to be point symmetric with respect to the central axis such that the four inner lattice points surround the central axis at the shortest distance. More specifically, the square lattice 800 includes four inner lattice points 810 and eight outer lattice points 820, which surround the four inner lattice points 810, and each of which has an adjacent relationship with any of the four inner lattice points 810. Note that no core is arranged at the lattice point 830, which does not have the adjacent relationship with any of the four inner lattice points 810.

The 12 cores each belong to either an inner core 110A (hereinafter, simply referred to as the core 110, when "the 12 cores" are mentioned) allocated to the four inner lattice points 810 or an outer core allocated to the eight outer lattice points 820. The distance between each of the center positions of the four inner cores 110A and the corresponding inner lattice point of the four inner lattice points 810 is 0.5 µm or less. On the other hand, the eight outer cores each belong to either a lattice point arranged core 110Ba or a lattice point unarranged core 110Bb. The lattice point arranged core 110Ba is a core in which the center is arranged at a position where the distance to the corresponding outer lattice point of the eight outer lattice points 820 is 0.5 µm or less. In addition, the lattice point unarranged core 110Bb is a core, the center of which is arranged at a position of a distance D1 (D1>2 µm) from the corresponding outer lattice point. In addition, the lattice point unarranged cores 110Bb are each arranged such that an angle θ (hereinafter, referred to as a "shift angle") formed by a line segment connecting the corresponding outer lattice point and a specific inner lattice point (an inner lattice point, of the four inner lattice points, having an adjacent relationship with the corresponding outer lattice point) and a line segment connecting the center of the lattice point unarranged core and the specific inner lattice point is three degrees or more and 30 degrees or less, three degrees or more and 25 degrees or less, or three degrees or more and 20 degrees or less. In addition, the ratio of the number of the lattice point arranged cores 110Ba to the number of the lattice point unarranged cores 110Bb is preferably 2 to 6, 4 to 4, or 6 to 2 like the examples illustrated in FIGS. 3 to 5. The lattice point unarranged cores 110Bb each have its center arranged at a position separated by a distance D3 ($\Lambda_{nominal}-0.5$ μm≤D3≤$\Lambda_{nominal}+0.5$ μm) from a specific inner lattice point, of the four inner lattice points 810, having an adjacent relationship with the corresponding outer lattice point (arranged on a periphery with the specific inner lattice point being as the center). The center of each lattice point unarranged core 110Bb is arranged such that a distance from a specific outer lattice point (see a pair of outer lattice points having an adjacent relationship illustrated in the upper part of FIG. 2) having an adjacent relationship with the corresponding outer lattice point is longer than the distance D1 from the corresponding outer lattice point, and in addition, is separated from any of the centers of the remaining lattice point unarranged cores 110Bb by a distance D2 (≥$\Lambda_{nominal}+3$ μm). In the present specification, in a case where the above-described conditions are satisfied, the lattice point unarranged core 110Bb is also defined to maintain the adjacent relationship with another core (the inner core 110A or another outer core), in a similar manner to the adjacent relationship between the lattice points.

Figure 3:
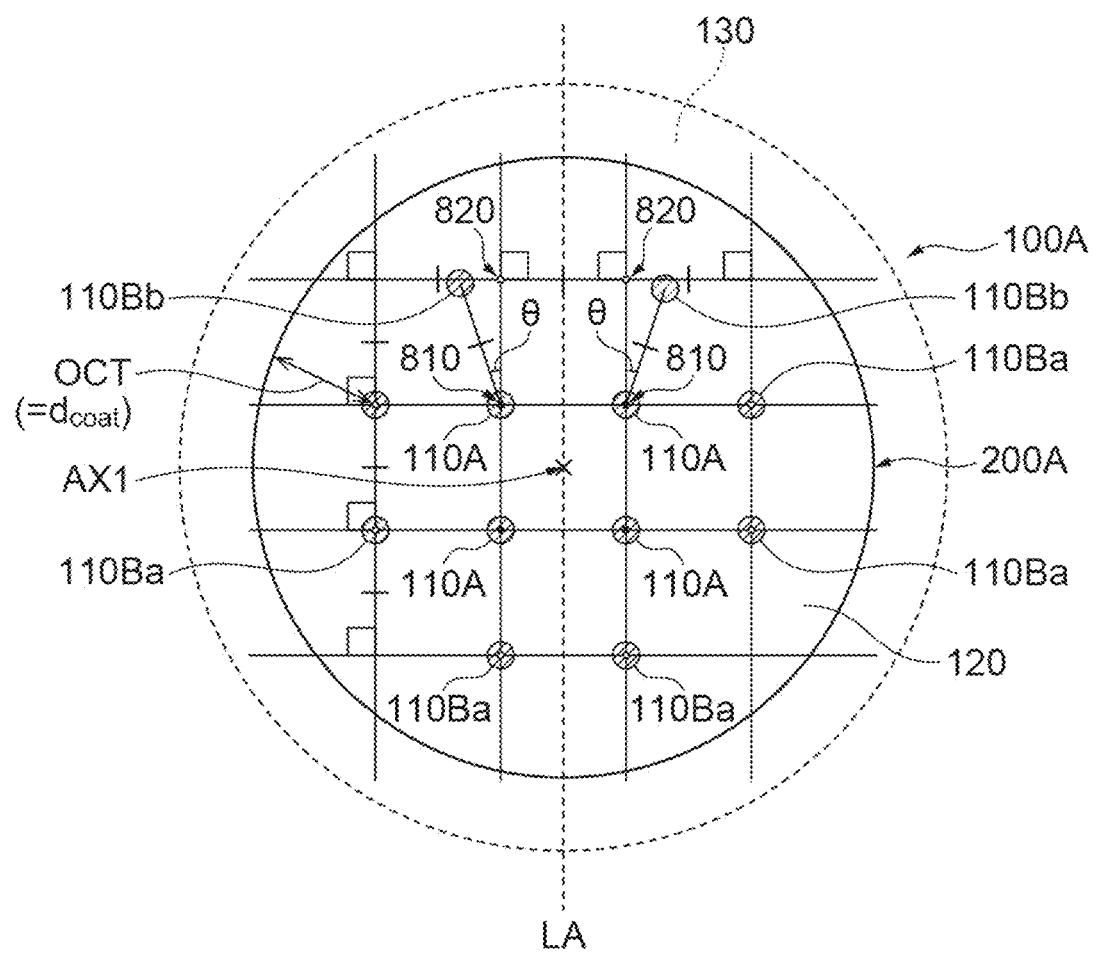
FIG. 3 is a diagram illustrating an example of the core arrangement in the MCF according to the present disclosure.
Figure 4:
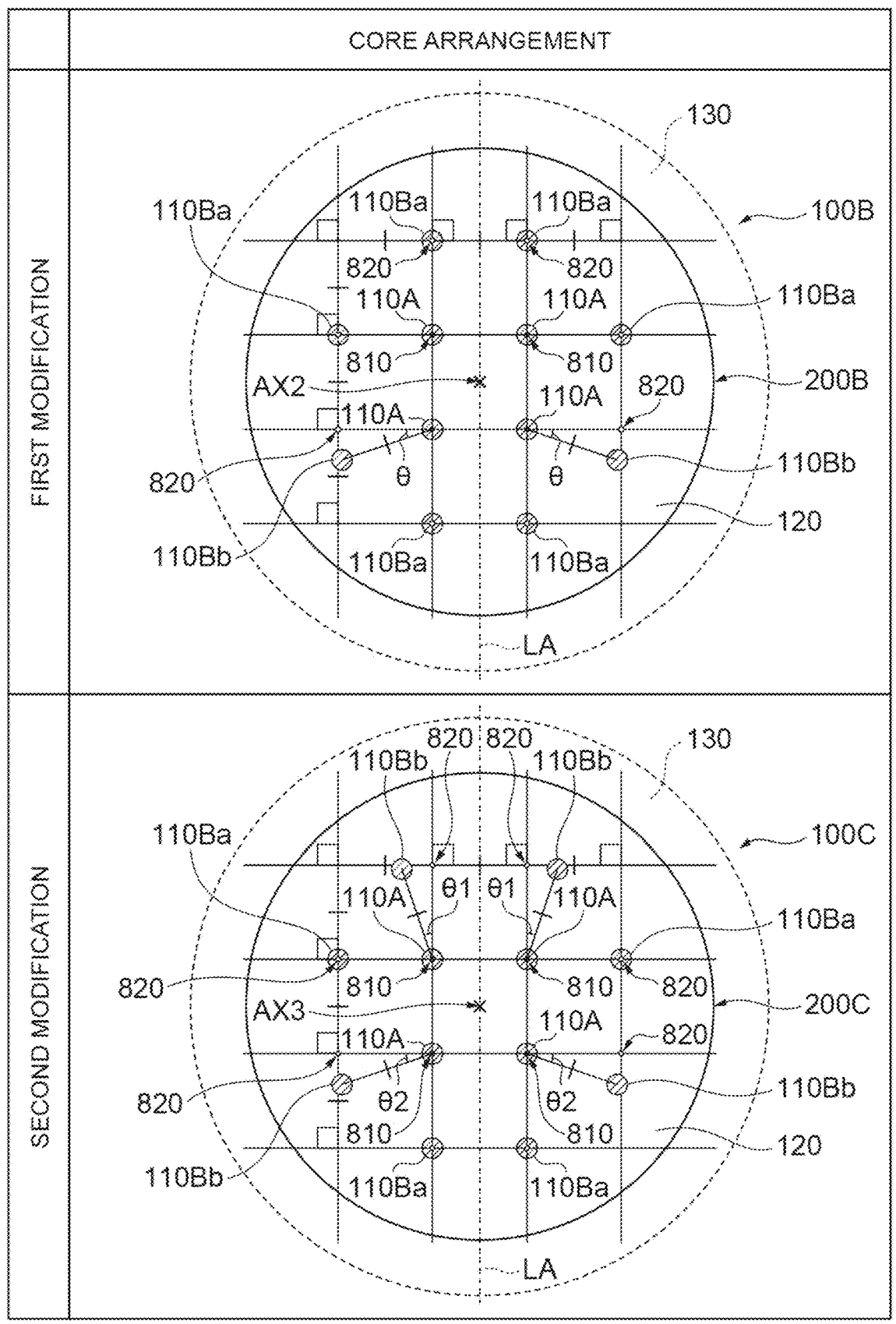
FIG. 4 is a diagram illustrating core arrangements in the MCF in a first modification and a second modification according to the present disclosure.
Figure 5:
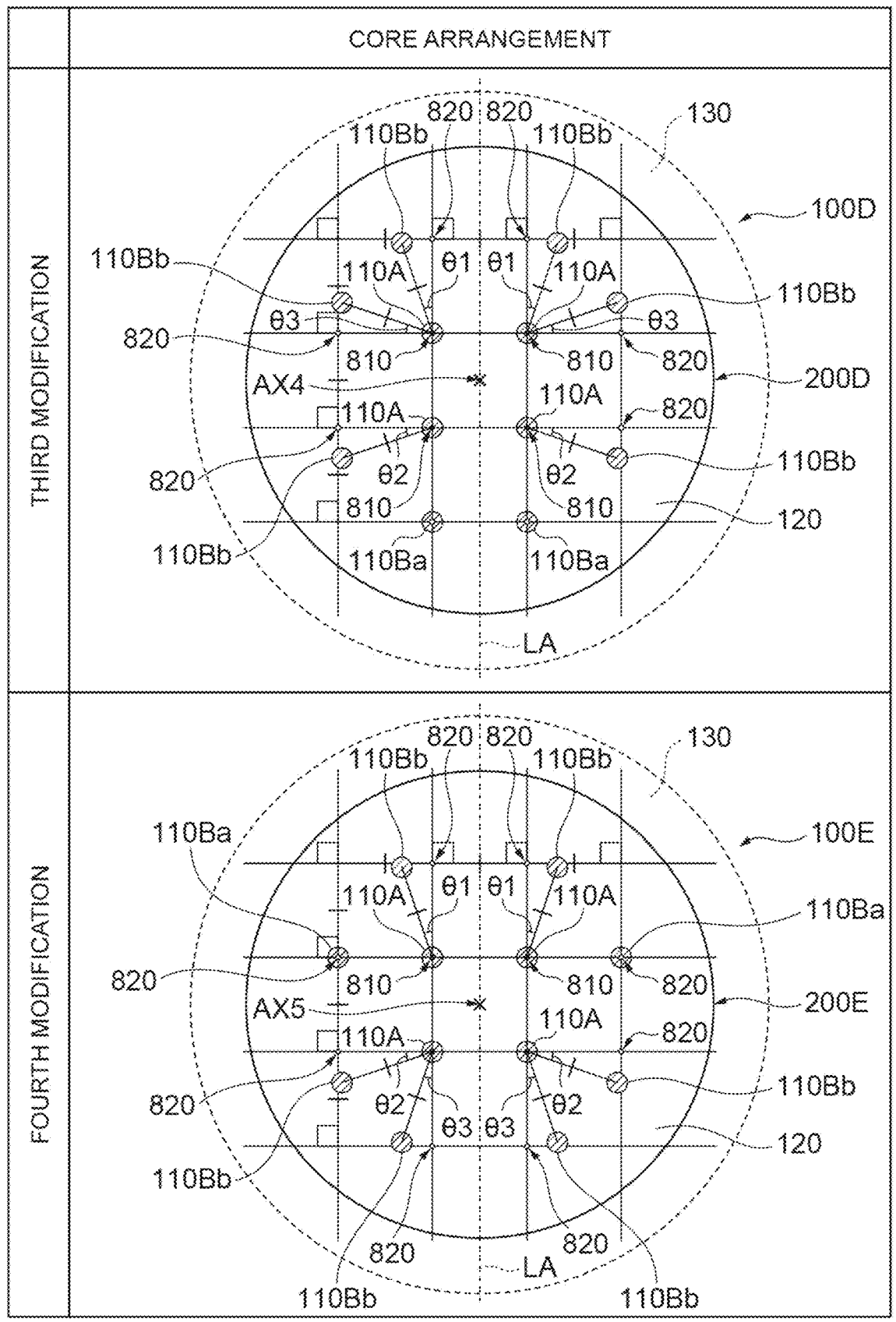
FIG. 5 is a diagram illustrating core arrangements in the MCF in a third modification and a fourth modification according to the present disclosure.
Figure 6:
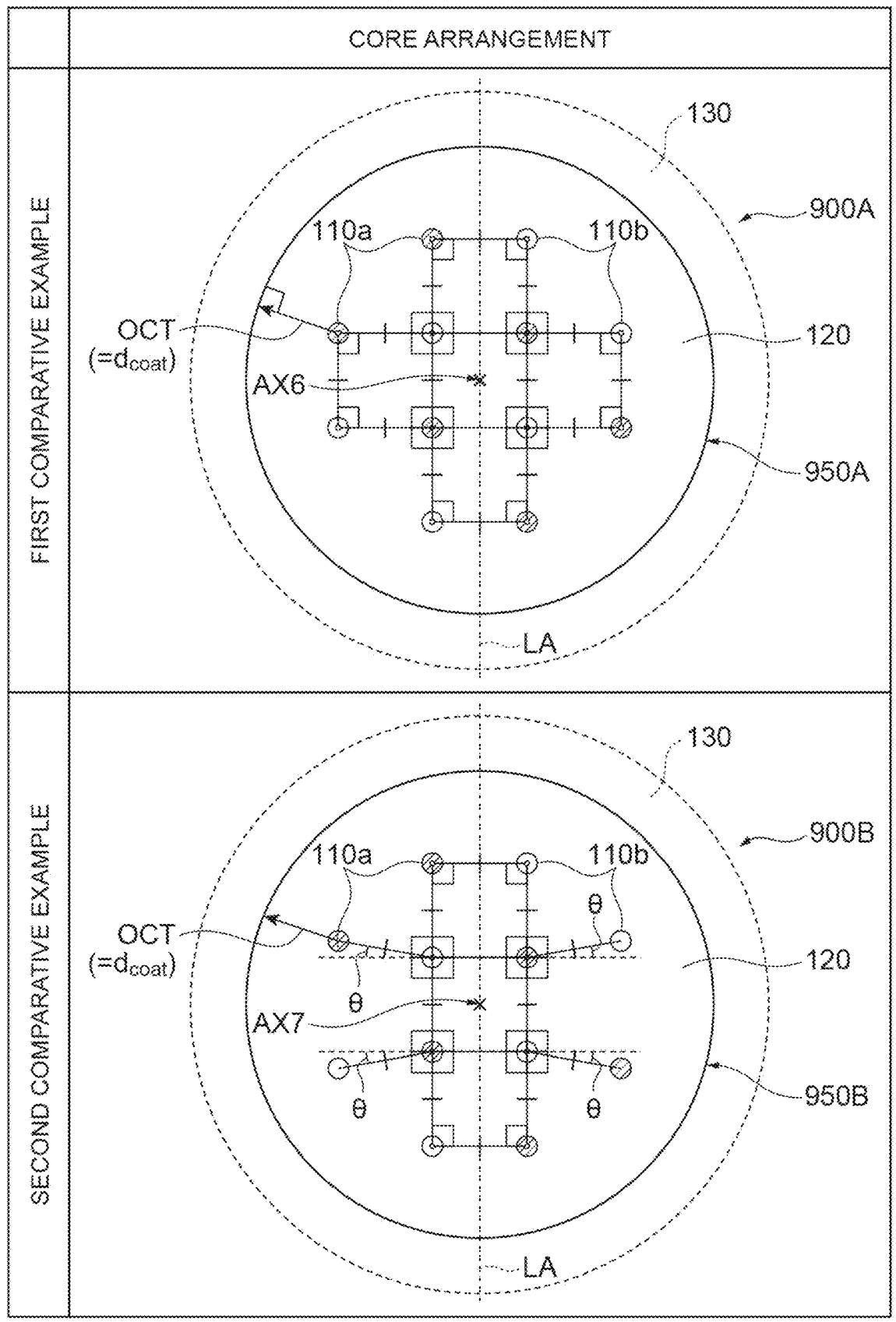
FIG. 6 is a diagram illustrating various core arrangements in the MCF in comparative examples.

FIG. 3 is a diagram illustrating an example of a core arrangement in the MCF (a 12-core MCF 100A) according to the present disclosure. FIGS. 4 and 5 are diagrams illustrating core arrangements in the 12-core MCF in first to fourth modifications of the present disclosure. In addition, FIG. 6 is a diagram illustrating various core arrangements in the 12-core MCF in a comparative example. Note that FIGS. 3 to 6 are illustrated as schematic diagrams in which the core positions or core dimensions are not based on actual scales in order to facilitate visual recognition. In addition, in any of FIGS. 3 to 6, a symmetry axis LA is indicated so that the 12 cores 110 arranged to be line symmetric is visually recognizable.

The 12-core MCF 100A illustrated in FIG. 3 includes a glass fiber 200A, and a resin coating 130, which covers the glass fiber 200A. The glass fiber 200A includes 12 cores 110, which extend along the central axis (a fiber axis AX1), and a common cladding 120, which covers each of the 12 cores 110. The 12 cores 110 are classified into the four inner cores 110A and the eight outer cores according to the type of lattice points to be allocated. In addition, the eight outer cores are classified into the lattice point arranged cores 110Ba and the lattice point unarranged cores 110Bb.

In the 12-core MCF 100A, the eight outer cores are classified into six lattice point arranged cores 110Ba and two lattice point unarranged cores 110Bb. The two lattice point unarranged cores 110Bb are respectively allocated to the outer lattice points 820 having an adjacent relationship with each other, and as illustrated in the drawing, the centers are each shifted from the corresponding outer lattice point 820 by an angle θ.

A 12-core MCF 100B (an upper part of FIG. 4) according to a first modification, a 12-core MCF 100C (a lower part of FIG. 4) according to a second modification, a 12-core MCF 100D (an upper part of FIG. 5) according to a third modification, a 12-core MCF 100E (a lower part of FIG. 5) according to a fourth modification, a 12-core MCF 900A (an upper part of FIG. 6) according to a first comparative example, and a 12-core MCF 900B (a lower part of FIG. 6) according to a second comparative example have the same structure as that of the 12-core MCF 100A illustrated in FIG. 3 except for the core arrangement. That is, the 12-core MCFs 100B to 100E respectively include glass fibers 200B to 200E corresponding to the above-described glass fiber 200A, and the resin coating 130. Similarly, the 12-core MCFs 900A and 900B respectively include glass fibers 950A and 950B corresponding to the above-described glass fiber 200A, and the resin coating 130.

The glass fibers 200B to 200E each include 12 cores 110, which extend along the central axis (fiber axes AX2 to AX5), and the common cladding 120, which covers each of the 12 cores 110. On respective cross-sections, which are orthogonal to the central axis, of the glass fibers 200B to 200E, the common cladding 120 has a circular outer periphery. The 12 cores 110 are classified into the four inner cores 110A and the eight outer cores according to the type of lattice points to be allocated. In addition, the eight outer cores are classified into the lattice point arranged cores 110Ba and the lattice point unarranged cores 110Bb.

On the other hand, the glass fibers 950A and 950B each include 12 cores that extend along the central axis (fiber axes AX6 and AX7), and the common cladding 120, which covers these 12 cores. Note that in the comparative examples illustrated in FIG. 6, a core arrangement is illustrated such that the 12 cores are constituted of first cores 110a and second cores 110b having different light propagation directions from each other. On the cross-sections, orthogonal to the central axis, of the glass fibers 950A and 950B, the common cladding 120 has a circular outer periphery. The 12 cores (the first cores 110a and the second cores 110b) are classified into four inner cores 110A and eight outer cores, according to the type of lattice points to be allocated. In addition, like the second comparative example, the eight outer cores are classified into the lattice point arranged cores 110Ba and the lattice point unarranged cores 110Bb.

In the 12-core MCF 100B (an upper part of FIG. 4) according to the first modification, the four inner cores 110A are respectively arranged on the inner lattice points 810 of the square lattice set on the cross-section orthogonal to the fiber axis AX2 (the distance between the inner lattice point 810 and the core center is 0.5 μm or less). Eight outer cores are disposed around the four inner cores 110A. Among the eight outer cores, six outer cores are arranged as the lattice point arranged cores 110Ba such that the distance between the outer lattice point 820, to which each outer core is allocated, and the core center is 0.5 μm or less. The remaining two outer cores are arranged as the lattice point unarranged cores 110Bb with the core centers shifted from the outer lattice points 820 to which each outer core is allocated, in a state where the adjacent relationship illustrated in the lower part of FIG. 2 is maintained. Therefore, in the 12-core MCF 100B, the ratio of the number of the lattice point arranged cores to the number of the lattice point unarranged cores is 6 to 2. Note that the respective shift angles θ coincide with each other between the two lattice point unarranged cores 110Bb making a pair, and the two lattice point unarranged cores 110Bb are arranged at positions to be line symmetric with respect to the symmetry axis LA (one pair in the first modification). However, the core arrangement in the 12-core MCF 100B does not have the rotational symmetry twice or more around the fiber axis AX2.

Furthermore, in comparing the core arrangement between the 12-core MCF 100A in FIG. 3 and the 12-core MCF 100B according to the first modification, the 12-core MCF 100A, in which the outer cores respectively allocated to the two outer lattice points 820 having an adjacent relationship are the lattice point unarranged cores 110Bb, has a larger asymmetry degree than that of the 12-core MCF 100B, in which only one of the outer cores respectively allocated to the two outer lattice points 820 having an adjacent relationship is the lattice point unarranged core 110Bb.

Similarly, in the 12-core MCF 100C (a lower part of FIG. 4) according to the second modification, four inner cores 110A are respectively arranged on the inner lattice points 810 of the square lattice set on the cross-section orthogonal to the fiber axis AX3, and eight outer cores are arranged around the inner lattice points 810. Among the eight outer cores, the four outer cores are respectively arranged on the outer lattice points 820, which are allocated as the lattice point arranged cores 110Ba. The remaining four outer cores are arranged as the lattice point unarranged cores 110Bb with the core centers shifted from the outer lattice points 820, to which the outer cores are respectively allocated, in a state where the adjacent relationship illustrated in the lower part of FIG. 2 is maintained. Therefore, in the 12-core MCF 100C, the ratio of the number of the lattice point arranged cores to the number of the lattice point unarranged cores is 4 to 4. Note that the two lattice point unarranged cores 110Bb making a pair are arranged at positions to be line symmetric with respect to the symmetry axis LA. However, the core arrangement in the 12-core MCF 100C does not have the rotational symmetry twice or more around the fiber axis AX3. In addition, regarding the pair of the lattice point unarranged cores 110Bb arranged to be line symmetric (two pairs in the second modification), the shift angle of one pair is $\theta_1$, and the shift angle of the other pair is $\theta_2$ (it is not necessary to coincide with $\theta_1$).

Similarly, in the 12-core MCF 100D (an upper part of FIG. 5) according to the third modification, four inner cores 110A are respectively arranged on the inner lattice points 810 of the square lattice set on the cross-section orthogonal to the fiber axis AX4, and eight outer cores are arranged around the inner lattice points 810. Among the eight outer cores, two outer cores are respectively arranged as the lattice point arranged cores 110Ba on the respectively allocated outer lattice points 820. The remaining six outer cores are respectively arranged as the lattice point unarranged cores 110Bb with the core centers shifted from the outer lattice points 820, to which the outer cores are respectively allocated, in a state where the adjacent relationship illustrated in the lower part of FIG. 2 is maintained. Therefore, in the 12-core MCF 100D, the ratio of the number of the lattice point arranged cores to the number of the lattice point unarranged cores is 2 to 6. Note that the two lattice point unarranged cores 110Bb making a pair are arranged at positions to be line symmetric with respect to the symmetry axis LA. However, the core arrangement in the 12-core MCF 100D does not have the rotational symmetry twice or more around the fiber axis AX4. In addition, regarding the pair of the lattice point unarranged cores 110Bb, which are arranged to be line symmetric (three pairs in the third modification), the shift angle of a first pair is $\theta_1$, the shift angle of a second pair is $\theta_2$, and the shift angle of a third pair is $\theta_3$. The shift angles $\theta_1$, $\theta_2$, and $\theta_3$ do not have to coincide with one another.

Similarly, in the 12-core MCF 100E (a lower part of FIG. 5) according to the fourth modification, four inner cores 110A are respectively arranged on the inner lattice points 810 of the square lattice set on the cross-section orthogonal to the fiber axis AX5, and eight outer cores are arranged around the inner lattice points 810. Similarly to the third modification, among the eight outer cores, two outer cores are arranged as the lattice point arranged cores 110Ba on the respectively allocated outer lattice points 820. The remaining six outer cores are respectively arranged as the lattice point unarranged cores 110Bb with the core centers shifted from the outer lattice points 820, to which the outer cores are respectively allocated, in a state where the adjacent relationship illustrated in the lower part of FIG. 2 is maintained. Therefore, in the 12-core MCF 100E, the ratio of the number of the lattice point arranged cores to the number of the lattice point unarranged cores is 2 to 6. The two lattice point unarranged cores 110Bb making a pair are arranged at positions to be line symmetric with respect to the symmetry axis LA. However, the core arrangement in the 12-core MCF 100E does not have the rotational symmetry twice or more around the fiber axis AX5. In addition, regarding the pair of the lattice point unarranged cores 110Bb arranged to be line symmetric (three pairs in the fourth modification), the shift angle of the first pair is $\theta_1$, the shift angle of the second pair is $\theta_2$, and the shift angle of the third pair is $\theta_3$. The shift angles $\theta_1$, $\theta_2$, and $\theta_3$ do not have to coincide with one another.

The 12-core MCF 900A (an upper part of FIG. 6) according to the first comparative example is an example in which no lattice point unarranged core is included in the eight outer cores, and the 12-core MCF 900B (a lower part of FIG. 6) according to the second comparative example includes four lattice point unarranged cores of the eight outer cores. In addition, any core arrangement in the 12-core MCFs 900A and 900B is constituted of 12 cores arranged to be line symmetric, unless the polarity is considered. However, any core arrangement in the 12-core MCFs 900A and 900B has the rotational symmetry twice or more around the fiber axes AX6 and AX7.

Figure 7:
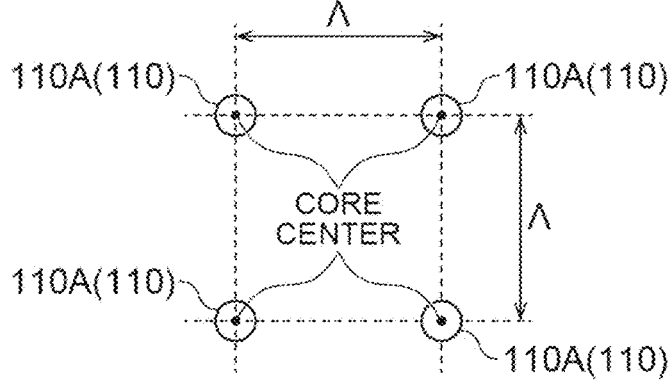
FIG. 7 is a diagram for describing main terms used in the present specification.

FIG. 7 is a diagram for describing main terms (adjacent relationship of inner cores, cross-sectional structure around cores, parallel propagation and parallel propagation XT (crosstalk), and counter propagation XT (crosstalk)) used in the present specification.

(Adjacent Relationship of Inner Core)

In the present specification, regarding an adjacent relationship between the cores, in focusing on one specific core of 12 arranged on the cross-section of the MCF, a core having a minimum center-to-center interval with respect to such one specific core and a difference from the minimum center-to-center interval of 2 μm or less is defined as a core having an adjacent relationship with such one specific core. In particular, in FIG. 7, a description will be given with regard to four inner cores 110A (the cores 110) respectively arranged on four inner lattice points 810 surrounding the fiber axis by a lattice point interval Λ. Among these four inner cores 110A, the pair of inner cores 110A constituting each side of the square lattice have an adjacent relationship with each other (the center-to-center interval between the inner cores 110A having the adjacent relationship is substantially Λ). On the other hand, the adjacent relationship is not established between the pair of inner cores 110A located on a diagonal line of the square lattice.

(Cross-Sectional Structure Around Cores)

In each of the 12-core MCFs 100A to 100E, in the cross-sectional structure around each core 110 (including the inner core 110A, the lattice point arranged core 110Ba, and the lattice point unarranged core 110Bb), the common cladding 120 surrounds the outer peripheries of the cores 110. The common cladding 120 may be provided to be in direct contact with the cores 110, but an optical cladding 121 may be provided between the common cladding 120 and the cores 110. In addition, a depressed layer 122 corresponding to a trench layer having a small relative refractive index difference Δ3 may be provided between the optical cladding 121 and the common cladding 120. Note that the optical cladding 121 is prepared for each core 110, and preferably has a relative refractive index difference Δ2 of −0.1% or more and 0.1% or less with respect to the refractive index of the common cladding 120. In addition, in a case where the depressed layer 122 is provided, the depressed 122 preferably has a relative refractive index difference Δ3 of −2.0% or more and less than −1.0%, −1.0% or more and less than −0.7%, −0.7% or more and less than −0.4%, or −0.4% or more and less than 0% with respect to the refractive index of the common cladding 120.

(Parallel Propagation and Parallel Propagation XT)

In the example illustrated in FIG. 7, three cores (first cores 110a each propagating light in an identical direction) in which adjacent relationships are established are illustrated. That is, the adjacent relationship is established between the left core and the center core, and the adjacent relationship is established between the center core and the right core. That is, a state in which the cores each having the adjacent relationship propagate light in the identical direction is referred to as "parallel propagation". In this case, a general inter-core XT (parallel propagation XT) is generated between the adjacent cores that propagate the light in the identical direction.

(Counter Propagation and Counter Propagation XT)

On the other hand, in counter propagation, light is propagated in directions different from each other between two cores in which the adjacent relationship is established. That is, in the example of FIG. 7, the adjacent relationship is established between the left core and the center core. However, the left core functions as a first core 110a, and the center core functions as a second core 110b, which propagates light in a direction different from that of the first core 110a. The general XT generated between the left core and the center core hardly affects the communication quality. In a similar manner, the right core having the adjacent relationship with the center core functions as the first core 110a, and the general XT generated between the right core and the center core hardly affects the communication quality. In this manner, a state in which the cores having the adjacent relationship propagate light in different directions from each other is referred to as "counter propagation". However, between the left core and the right core (both of which function as the first cores 110a), the XT affects the communication quality via the center core (which functions as the second core 110b). In this manner, the inter-core XT that propagates the light in the identical direction via the core that establishes the adjacent relationship and that propagates the light in the opposite direction is referred to as "counter propagation XT".

Note that in the following description, a description will be given with reference to examples of "parallel propagation" and "counter propagation" illustrated in FIG. 7. However, in a case where $XT_{co}(L1)$ represents an XT (parallel propagation XT: $XT_{co}$) between the cores between which the adjacent relationship is established (hereinafter, referred to as an "adjacent core") at a fiber length L1, and the XT is represented in decibel value, the XT can be expressed in the following Formula (21):

$$XT_{co}(L2)=XT_{co}(L1)+10\log_{10}(L2/L1) \tag{21},$$

and XT is increased by 10 dB at a distance of 10 times.

In a case where the XT is represented in decibel value, for example, in the example of the counter propagation illustrated in FIG. 7, the XT (the counter propagation XT: $XT_{counter}$) from the right core to the left core via the center core can be expressed in the following Formula (22) using the parallel propagation XT: $XT_{co}$ between the left core and the center core and between the center core and the right core:

$$XT_{counter}=2XT_{co}-10\log_{10}2 \tag{22}.$$

Assuming that the counter propagation XT at the fiber length L1 is $XT_{counter}$ (L1), in a case where XT is expressed in decibel value, the counter propagation XT at a fiber length L2 can be expressed in the following Formula (23):

$$XT_{counter}(L2)=XT_{counter}(L1)+20\log_{10}(L2/L1) \tag{23},$$

and $XT_{counter}$ is increased by 20 dB at a distance of 10 times.

A total $XT_{co,tot}$ of $XT_{co}$ from an adjacent core to a predetermined core is calculated in the following Formula (24), in a case where N represents the number of adjacent cores to the predetermined core:

$$XT_{co,tot}=XT_{co}+10\log_{10}N \tag{24}.$$

The above Formula (24) is presupposed that $XT_{co}$ between the adjacent cores is uniform. In a case where a difference in $XT_{co}$ between the adjacent cores is not negligible, and $XT_{co,n}$ represents $XT_{co}$ from a core n of N adjacent cores to a predetermined core, the total $XT_{co,tot}$ is expressed in the following Formula (25):

$$XT_{co,tot} = 10\log_{10}\left(\sum_{n}^{N} 10^{\frac{XT_{co,n}}{10}}\right). \tag{25}$$

The total $XT_{counter,tot}$ of the counter propagation XT to a predetermined core seems to be calculated by the following Formula (26), where M is the number of "adjacent cores of an adjacent core (corresponds to a right core, in a case where the predetermined core is a left core in the example of the counter propagation illustrated in FIG. 7)":

$$XT_{counter,tot}=XT_{counter}+10\log_{10}M=2XT_{co}-10\log_{10}2+10\log_{10}M \tag{26}.$$

However, the fact is different, and the inventor has discovered that in a case where $K_n$ represents the number of adjacent cores (including the predetermined core) with respect to the core n of N adjacent cores (center cores) of the predetermined core (the left core), $XT_{counter,tot}$ is expressed in the following Formula (27):

$$XT_{counter,tot} = XT_{counter} + 10\log_{10}\sum_{n=1}^{N}(K_n - 1) = \tag{27}$$

$$2XT_{co} - 10\log_{10}2 + 10\log_{10}\sum_{n=1}^{N}(K_n - 1).$$

Therefore, in the 12-core MCF, $XT_{counter,tot}$ to any of the four cores that belong to an inner core group can be expressed in the following Formula (28):

$$XT_{counter,tot} \leq XT_{counter} + 10\log_{10}8 = 2XT_{co} + 10\log_{10}\frac{8}{2}. \tag{28}$$

Thus, in order to set the counter propagation XT after propagation for 10 km (corresponding to a fiber length of 10 km) in the 12-core MCF to −20 dB (=−20 dB/10 km) or less, the parallel propagation XT ($XT_{co}$) between the adjacent cores in terms of a fiber length L (kin) is preferably expressed in the following Formula (29):

$$XT_{co,tot}(L) \leq -12.8 + 10\log_{10}\frac{L}{10}. \quad (29)$$

In addition, the sum of the parallel propagation XT from the four cores each having an adjacent relationship with any one of the four cores that belong to the inner core group is preferably expressed in the following Formula (30):

$$XT_{co,tot}(L) \leq -6.8 + \log_{10}\frac{L}{10}. \quad (30)$$

In order to set the counter propagation XT after the propagation for 10 km (corresponding to the fiber length of 10 km) in the 12-core MCF to −40 dB (=−40 dB/10 km) or less, the parallel propagation XT ($XT_{co}$) between the adjacent cores in terms of the fiber length L (kin) is preferably expressed in the following Formula (31):

$$XT_{co}(L) \leq -22.8 + 10\log_{10}\frac{L}{10}. \quad (31)$$

In addition, the sum of the parallel propagation XT from the four cores each having an adjacent relationship with any one of the four cores that belong to the inner core group is preferably expressed in the following Formula (32):

$$XT_{co,tot}(L) \leq -16.8 + 10\log_{10}\frac{L}{10}. \quad (32)$$

Figure 8:
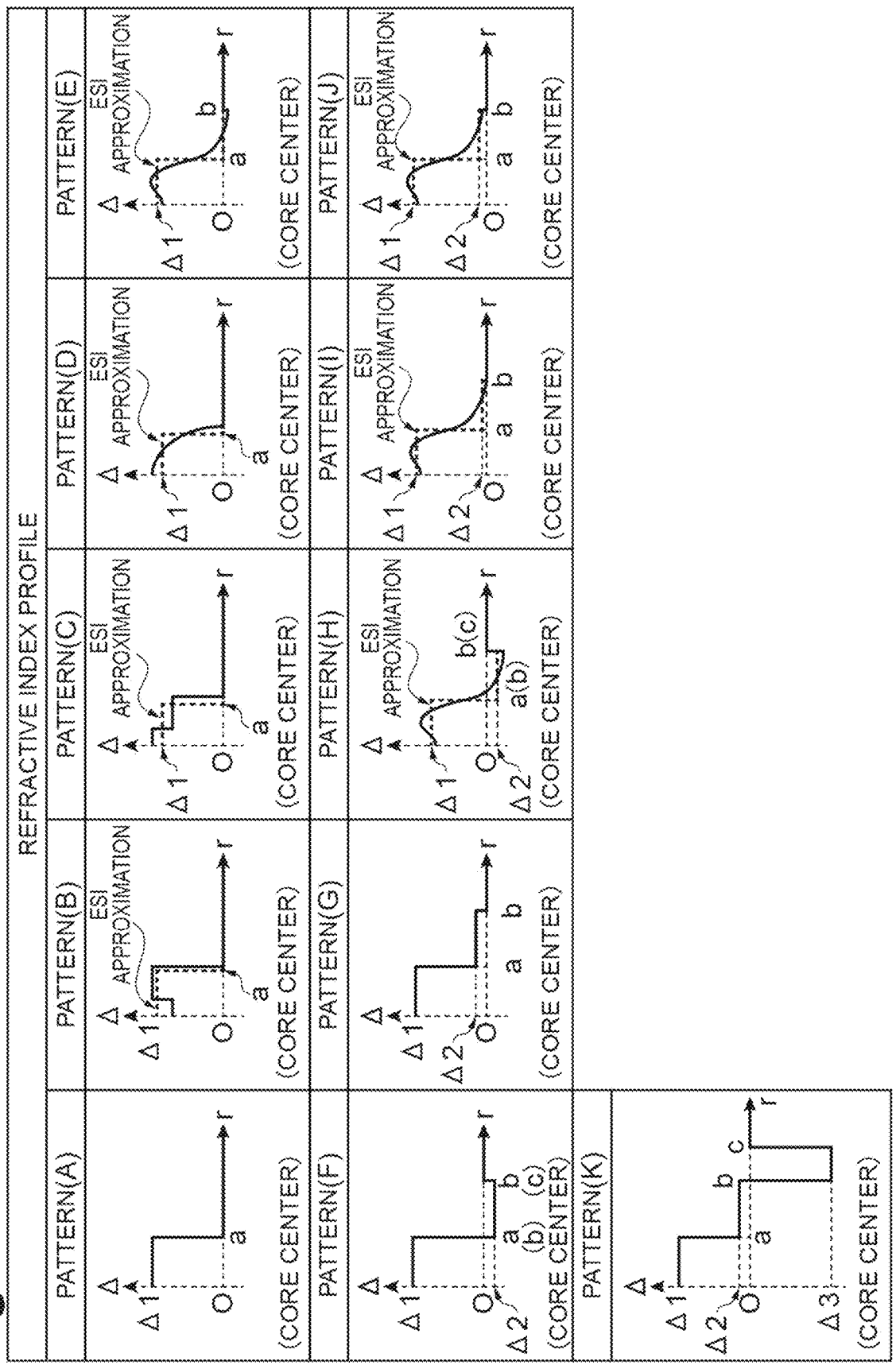
FIG. 8 is a diagram illustrating a refractive index profile around each core applicable to the MCF according to the present disclosure.

Next, a profile structure applicable to the MCFs according to the present disclosure will be described. FIG. 8 is a diagram illustrating a refractive index profile around each core applicable to the MCF according to the present disclosure. Note that unless otherwise specified, a "relative refractive index difference Δ" means a relative refractive index difference with respect to the refractive index of the common cladding (and therefore, is not the relative refractive index difference with respect to the refractive index of pure silica glass).

Regarding the core structure in the MCF according to the present disclosure, an appropriate structure is selectable for the refractive index profile of the core and the optical characteristics associated with the profile in accordance with the use application. For example, the refractive index profiles of patterns (A) to (K) illustrated in FIG. 8 are applicable. Note that in FIG. 8, Δ represents a relative refractive index difference with the refractive index of the common cladding used as a reference, r represents a radius vector (radius) from each core center, and a local coordinate system in which each core center·Δ=0% is set to an origin O is illustrated. Structures may be the same or different between the cores.

The pattern (A) illustrated in FIG. 8 is a step type refractive index profile, the pattern (B) is a ring type refractive index profile, the pattern (C) is a double step type refractive index profile, the pattern (D) is a graded type refractive index profile, and the pattern (E) is a fringe type refractive index profile. These are applicable to the core structure in the MCF according to the present disclosure.

Further, the pattern (F) and the pattern (H) in which a Depressed type refractive index profile is provided around the core, the pattern (G), the pattern (I), and the pattern (J) in which a Raised type refractive index profile is provided around the core, and the pattern (K) in which a Trench-assisted type refractive index profile is provided around the core are also applicable to the core structure.

For the refractive index profiles other than the step type refractive index profile of the pattern (A), a core radius a and Δ (Δ1) of the core of a case of being approximated by the step type by using an equivalent-step-index (ESI) approximation are obtainable (the above-described Non-Patent Document 3).

The above-described Non-Patent Document 3 is easily applicable to a case where the boundary between the core and the cladding is clear. However, it is difficult to apply the above-described Non-Patent Document 3 to a case where the boundary between the core and the cladding (the common cladding 120 or the optical cladding 121) is unclear as the fringe type refractive index profile of the pattern (E). For example, in a case where the method of the above-described Non-Patent Document 3 is applied without change with b in the pattern (E) regarded as the radius of the core, the ESI approximation does not work well. In such a case, it is preferable to apply the above-described Non-Patent Document 3 with r that takes 2/5Δ of Δ at r, in which a slope (∂Δ/∂r) of the refractive index profile takes a negative value having a largest absolute value, and which is regarded as the core radius a. In this situation, regarding the refractive index of the cladding (the common cladding 120 or the optical cladding 121), by using r that is a value obtained from a simple average of Δ in a range from a to b expressed in the following Formula (33):

$$\Delta 2 \approx \int_a^b \Delta dr \quad (33)$$

or a weighted average with r represented in the following Formula (34):

$$\Delta 2 \approx \int_a^b \Delta r dr / \int_a^b r dr, \quad (34)$$

a and Δ1 (a maximum relative refractive index difference between the first core 110a and the second core 110b) can be obtained by the calculation based on the above Non-Patent Document 3. Δ2 (a relative refractive index difference of the optical cladding 121) is preferably −0.10% or more and 0.10% or less. This is because the manufacturing performance is largely improved.

The depressed layer 122 having a refractive index lower than those of the optical cladding 121 and the common cladding 120 may be provided around the optical cladding 121 (the pattern (K) in FIG. 8). However, in a case where a relative refractive index difference Δ3 of the depressed layer 122 with the refractive index of the common cladding 120 used as a reference is −0.5% or less, the manufacturing performance is largely degraded. Therefore, Δ3≥−0.4% is preferable, Δ3≥−0.3% is more preferable, and Δ3≥−0.2% is further preferable. Note that from the viewpoint of the manufacturing performance, the absence of the depressed layer is more preferable.

Regarding the material of the core and the cladding (the optical cladding 121 or the common cladding 120), glass containing silica glass as a main component is preferable, because a low transmission loss and high mechanical reliability are achievable. By adding Ge to the core, a refractive index difference generated between the core and the cladding is preferable. Alternatively, by adding F to the cladding, a refractive index difference generated between the core and the cladding is preferable. By adding a minute amount of F to the core and the optical cladding, a Depressed type profile is achievable with good manufacturing performance, and is preferable. Cl may be added to the core or the cladding. This enables suppression of an OH group and suppression of an absorption loss caused by the OH group. A minute amount of P may be contained in the core or the cladding. This enables an enhancement in manufacturing performance in a part of a glass synthesis process.

Note that it is preferable that the MCFs according to the present disclosure having the cross-sectional structure illustrated in FIGS. 2 to 5 each include the resin coating 130, and the diameter of the resin coating 130 falls within a range of 235 μm or more and 265 μm or less with 250 μm used as a reference. Accordingly, the MCF according to the present disclosure formed into a cable is enabled without making a significant change to existing cabling facilities or the like.

Note that in a typical general-purpose SMF, the nominal value $CD_{nominal}$ of a cladding diameter (a diameter of the glass fiber 200) is 125 μm, and the nominal value of the diameter (a diameter nominal value) of the resin coating 130 is approximately 245 μm or more and 250 μm. However, in the coated small-diameter SMF, the diameter nominal value of the resin coating is 180 μm, 190 μm, or 200 μm, in some cases. In this situation, the nominal value of the thickness (the coating thickness nominal value) of the resin coating 130 is respectively 27.5 μm, 32.5 μm, or 37.5 μm. As the thickness of the resin coating 130 is reduced, in a case where sand, dust, or the like damages the coating surface, the damage may reach the cladding comprised of glass and may weaken the strength of the optical fiber. Therefore, a sufficient coating thickness nominal value is demanded.

In the MCFs according to the present disclosure, in order to achieve the diameter nominal value of the resin coating 130 of 250 μm and the coating thickness nominal value of 27.5 μm or more, the nominal value $CD_{nominal}$ of the cladding diameter is preferably 195 μm or less.

Further, in order to achieve the diameter nominal value of the resin coating 130 of 245 μm and the coating thickness nominal value of 27.5 μm or more, the $CD_{nominal}$ is further preferably 190 μm or less. In order to achieve the diameter nominal value of the resin coating 130 of 250 μm and the coating thickness nominal value of 32.5 μm or more, the $CD_{nominal}$ is preferably 185 μm or less. In order to achieve the diameter nominal value of the resin coating 130 of 245 μm and the coating thickness nominal value of 32.5 μm or more, the $CD_{nominal}$ is preferably 180 μm or less. In order to achieve the diameter nominal value of the resin coating 130 of 250 μm and the coating thickness nominal value of 37.5 μm or more, the $CD_{nominal}$ is preferably 175 μm or less. Furthermore, in order to achieve the diameter nominal value of the resin coating 130 of 245 μm and the coating thickness nominal value of 37.5 μm or more, the $CD_{nominal}$ is preferably 170 μm or less. In each case, the tolerance of the coating thickness preferably falls within a range of the nominal value−15 μm or more and the nominal value+15 μm or less, and more preferably falls within a range of the nominal value−10 μm or more and the nominal value+10 μm or less.

Each core in the MCF according to the present disclosure preferably includes an MFD that falls within a range of a value of the MFD reference value−0.4 μm or more and a value of the MFD reference value+0.4 μm or less, with a value of 8.6 μm or more and 9.2 μm or less at a wavelength of 1310 nm used as the MFD reference value. In this case, among the general-purpose SMFs regulated in ITU-T G.652, in particular, as compared with a splice loss between the general-purpose SMFs of a type in which the nominal value of the MFD $MFD_{nominal}$ is small ($MFD_{nominal} \approx 8.6$ μm) and a bending loss is suppressed, a splice loss caused by an axis deviation between the MCFs according to the present disclosure (in a case where a predetermined axis deviation is given) can be made equal or less.

Each core in the MCF according to the present disclosure preferably includes an MFD that falls within a range of 8.2 μm or more and 9.0 μm or less with 8.6 μm used as a reference at the wavelength of 1310 nm. Accordingly, among the general-purpose SMFs regulated in ITU-T G.652, regarding the splice between a general-purpose SMF of a type in which the nominal value of the MFD is small and the bending loss is suppressed and the MCF according to the present disclosure, a splice loss caused by a core central axis deviation (an axis deviation) (in a case where a predetermined axis deviation is given) can be made equal.

Each core in the MCF according to the present disclosure preferably includes an MFD that falls within a range of the MFD reference value−0.4 μm or more and the MFD reference value+0.4 μm or less at the wavelength of 1310 nm, with a value of 8.2 μm or more and 8.6 μm or less used as an MFD reference value. Accordingly, among the general-purpose SMFs regulated in ITU-T G.652, in particular, for the general-purpose SMF of a type in which the $MFD_{nominal}$ is small ($MFD_{nominal} \approx 8.6$ μm) and a bending loss is suppressed, a splice loss caused by an axis deviation of the MCF according to the present disclosure (in a case where a predetermined axis deviation is given) can be suppressed to an increase of 10% or less. This means that in a case of the axis deviation in which 0.15 dB is the splice loss of the general-purpose SMF of the type in which the bending loss is suppressed, the splice loss of the MCF according to the present disclosure is 0.15 dB or more and 0.165 dB or less. In a case of the axis deviation, in which 0.25 dB is the splice loss of the general-purpose SMF of the type in which the bending loss is suppressed, the splice loss of the MCF according to the present disclosure is 0.25 dB or more and 0.275 dB or less. In a case of the axis deviation, in which 0.50 dB is the splice loss of the general-purpose SMF of the type in which the bending loss is suppressed, the splice loss of the MCF according to the present disclosure is 0.50 dB or more and 0.55 dB or less. In a case of the axis deviation, in which 0.75 dB is the splice loss of the general-purpose SMF of the type in which the bending loss is suppressed, the splice loss of the MCF according to the present disclosure is 0.75 dB or more and 0.825 dB or less. In this situation, it is preferable that as the $MFD_{nominal}$ is smaller, the confinement of light to the core can be enhanced, and the leakage loss to the inter-core XT and the resin coating can be suppressed.

The MCF according to the present disclosure preferably has a zero-dispersion wavelength of 1300 nm or more and 1324 nm or less. Accordingly, a distortion of the signal waveform after transmission on an O-band can be suppressed to an extent same as that of the general-purpose SMF.

The MCF according to the present disclosure preferably has a zero-dispersion wavelength that falls within a range of a value of the wavelength reference value−12 nm or more and a value of the wavelength reference value+12 nm or less, with a predetermined value uses as a wavelength reference value of 1312 nm or more and 1340 nm or less. Accordingly, a distortion of the signal waveform after transmission on the O-band can be suppressed more than that of the general-purpose SMF (see the above-described Non-Patent Document 4).

In the MCF according to the present disclosure, on a used wavelength band, the total sum of the XT from the cores adjacent to any core is preferably −20 dB (=−20 dB/10 km) or less, even after the propagation for 10 km (corresponding to the fiber length of 10 km). The XT from the core other than the adjacent cores is sufficiently low and can be ignored. Therefore, a sufficient signal-to-noise ratio is achievable even in a case where a coherent wave is detected.

In the MCF according to the present disclosure, on the used wavelength band, the total sum of the XT from the cores adjacent to any core is preferably −40 dB (=−40 dB/10 km) or less, even after the propagation for 10 km (corresponding to the fiber length of 10 km). The XT from the core other than the adjacent cores is sufficiently low and can be ignored. Therefore, a sufficient signal-to-noise ratio is achievable even in a case where an intensity modulation wave is directly detected.

In the MCF according to the present disclosure, on the used wavelength band, the total sum (the parallel propagation XT) of the XT from the cores adjacent to any core is preferably −6.8 dB (=−6.8 dB/10 km) or less, even after the propagation for 10 km (corresponding to the fiber length of 10 km). Accordingly, in the 12-core MCF having a core arrangement in which the 12 cores are arranged in the square lattice shape (in the present embodiment, a "square core arrangement" refers to a core arrangement in which the four inner cores are arranged on the square lattice, whereas the centers of some of the eight outer cores are shifted from the lattice points to which they are allocated), when bidirectional communication in which the signal propagation directions between the adjacent cores are made opposite to each other is performed for all pairs of the adjacent cores, it is possible to suppress the counter propagation XT, which can be problematic as described above, (like the example of FIG. 7, the total sum of XT to reach via the adjacent core that propagates the light in an opposite direction) to any one of the cores to −20 dB (=−20 dB/10 km) or less, even after the propagation for 10 km (corresponding to the fiber length of 10 km).

In the MCF according to the present disclosure, on the used wavelength band, the parallel propagation XT is preferably −16.8 dB (=−16.8 dB/10 km) or less, even after the propagation for 10 km (corresponding to the fiber length of 10 km). Accordingly, even after the propagation for 10 km (corresponding to the fiber length of 10 km), the counter propagation XT can be suppressed to −40 dB (=−40 dB/10 km) or less.

In the following description, a description will be given with regard to studied results about an MCF including cores having the refractive index profiles of the pattern (E), the pattern (H), and the pattern (J) of FIG. 8, and having a of 3 µm or more and 5 µm or less, Δ1−Δ2 of 0.3% or more and 0.6% or less, Δ2 of −0.1% or more and 0.1% or less, and b/a of 2 or more and 5 or less.

The core structure having a predetermined zero-dispersion wavelength and the MFD can be designed by those skilled in the art by calculating an electric field distribution in a base mode and a wavelength dependency of an effective refractive index using a finite element method or the like. For example, in ranges of 3 µm≤a≤5 µm and 0.3%≤(Δ1−Δ2)≤0.6%, the relationship between a and (Δ1−Δ2) to be a zero-dispersion wavelength $\lambda_0$ [µm] is expressed in the following Formula (35):

$$a \approx 0.0667(\lambda_0-1343.1)(\Delta1-\Delta2)^2+0.0900(\lambda_0-1354.6)(\Delta1-\Delta2)-0.0517(\lambda_0-1411.2) \quad (35).$$

Therefore, in order for the zero-dispersion wavelength $\lambda_0$ [µm] to fall within the range of a value of $\lambda_{0nominal}$−12 nm or more and a value of $\lambda_{0nominal}$+12 nm or less, the relationship between a and (Δ1−Δ2) preferably satisfies both the following Formulas (36) and (37):

$$a \leq 0.0667(\lambda_{0nominal}-12-1343.1)(\Delta1-\Delta2)^2+0.0900(\lambda_{0nominal}-12-1354.6)(\Delta1-\Delta2)-0.0517(\lambda_{0nominal}-12-1411.2) \quad (36); \text{ and}$$

$$a \geq 0.0667(\lambda_{0nominal}+12-1343.1)(\Delta1-\Delta2)^2+0.0900(\lambda_{0nominal}+12-1354.6)(\Delta1-\Delta2)-0.0517(\lambda_{0nominal}+12-1411.2) \quad (37).$$

In addition, the relationship between a and (Δ1−Δ2) with respect to MFD [µm] at the wavelength of 1310 nm, in ranges of 3 µm≤a≤5 µm and 0.3%≤(Δ1−Δ2)≤0.6%, is expressed in the following Formula (38):

$$(\Delta1-\Delta2)=(-0.0148\text{MFD}+0.213)[a-0.619\text{MFD}+2.01]^2-0.0771\text{MFD}+1.033 \quad (38).$$

Therefore, in order for the MFD [µm] to fall within a range of a value of $\text{MFD}_{nominal}$−0.4 µm or more and a value of $\text{MFD}_{nominal}$+0.4 µm or less, the relationship between a and (Δ1−Δ2) preferably satisfies both the following Formulas (39) and (40):

$$(\Delta1-\Delta2) \leq [-0.0148(\text{MFD}_{nominal}+0.4)+0.213][a-0.619(\text{MFD}_{nominal}+0.4)+2.01]^2-0.0771(\text{MFD}_{nominal}+0.4)+1.033 \quad (39); \text{ and}$$

$$(\Delta1-\Delta2) \geq [-0.0148(\text{MFD}_{nominal}-0.4)+0.213][a-0.619(\text{MFD}_{nominal}-0.4)+2.01]^2-0.0771(\text{MFD}_{nominal}-0.4)+1.033 \quad (40).$$

It is sufficient to set b/a and Δ2 so that $\lambda_{cc}$ is 1260 nm or less or 1360 nm or less, and the zero-dispersion slope is 0.092 ps/(nm²·km). For this purpose, Δ2 preferably falls within a range of −0.1% or more and 0.0% or less, and b/a preferably falls within a range of 2 or more and 4 or less.

Figure 9:
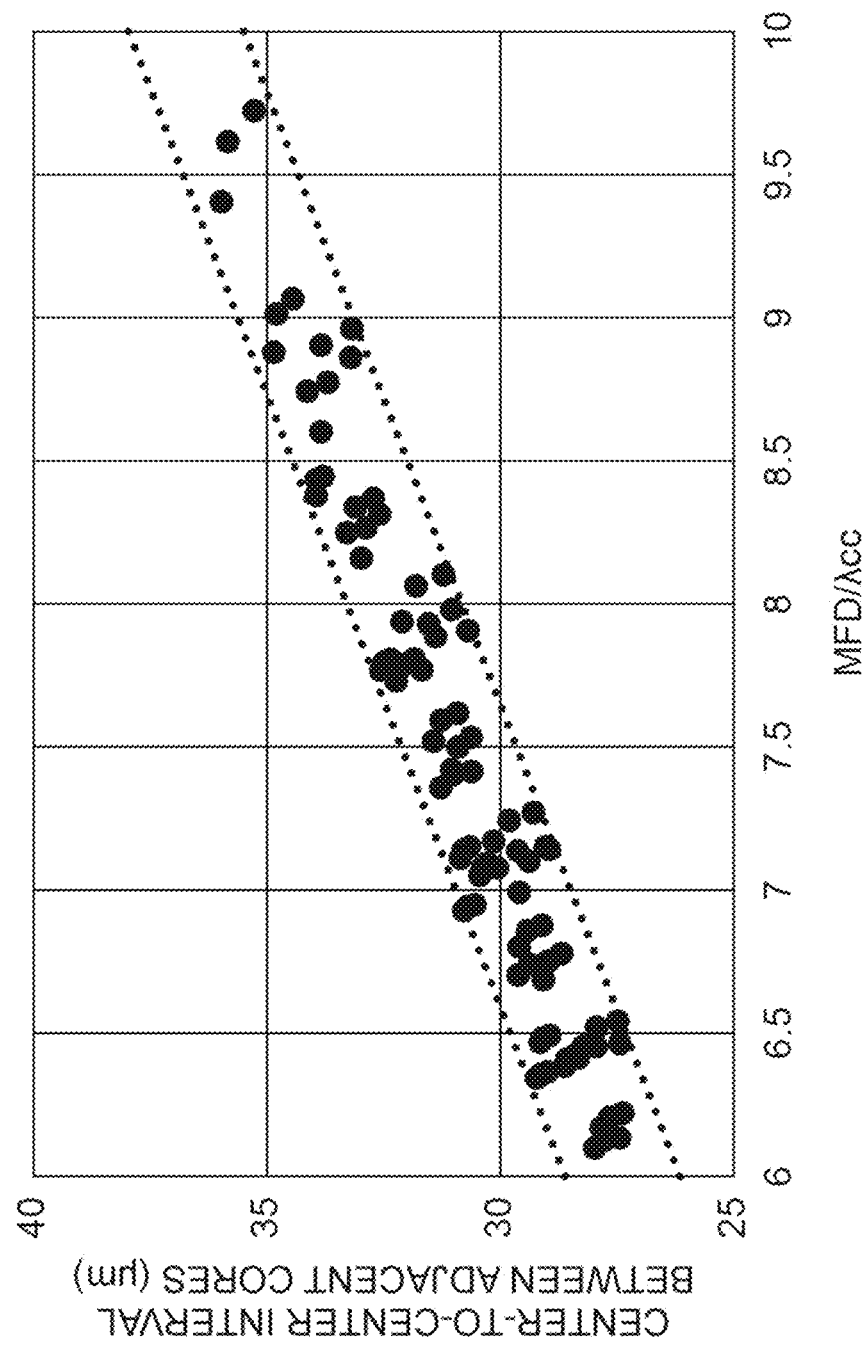
FIG. 9 is a graph illustrating a relationship between a center-to-center interval $\Lambda$ between adjacent cores and MFD/$\lambda_{cc}$ of a case where a counter propagation XT at a wavelength of 1360 nm after propagation for 10 km (corresponding to a fiber length of 10 km) is −20 dB (=−20 dB/10 km), in an MCF in which 12 cores are arranged to constitute a square lattice (hereinafter, referred to as a "12-core MCF")

Next, a preferable center-to-center interval Λ between adjacent cores will be described. FIG. 9 is a graph illustrating a relationship between the center-to-center interval Λ between adjacent cores and MFD/$\lambda_{cc}$ of a case where the counter propagation XT at the wavelength of 1360 nm after propagation for 10 km (corresponding to the fiber length of 10 km) is −20 dB (=−20 dB/10 km), in the 12-core MCF in which 12 cores are arranged to constitute the square lattice. Note that MFD/$\lambda_{cc}$ is a dimensionless amount, and MFD and $\lambda_{cc}$ are obtained in the same units. Here, an average value R of the fiber bending radii is 0.14 m. As long as R is 0.14 m or less, a lower XT is achievable. Note that $\lambda_{cc}$ denotes a cable cutoff wavelength that has been measured with a configuration (a fiber that is not formed into a cable) of FIG. 12 of ITU-T G.650.1 (March 2018).

In order to set the counter propagation XT after the propagation for 10 km at the wavelength of 1360 nm (corresponding to the fiber length of 10 km) to −20 dB or less, the center-to-center interval Λ between the adjacent cores and MFD/$\lambda_{cc}$ preferably satisfy at least one of the following Formula (41) and Formula (42) (a region above a lower dotted line in FIG. 9):

$$\Lambda \geq 2.34\text{MFD}/\lambda_{cc}+12.1 \quad (41); \text{ and}$$

$$\text{MFD}/\lambda_{cc} \leq 0.428\Lambda-5.19 \quad (42),$$

and more preferably satisfy at least one of the following Formula (43) and Formula (44) (a region above an upper dotted line in FIG. 9):

$$\Lambda \geq 2.34\text{MFD}/\lambda_{cc}+14.6 \qquad (43); \text{ and}$$

$$\text{MFD}/\lambda_{cc} \leq 0.428\Lambda-6.25 \qquad (44).$$

In order to allow the position of each core to vary from the design center, $\Lambda$ preferably takes a margin of 1 µm from the ranges indicated in the above Formulas (41) to (44). Thus, in a case where the nominal value of such $\Lambda$ is set to $\Lambda_{nominal}$, $\Lambda$ satisfies at least the following Formula (45):

$$\Lambda_{nominal} \geq 2.34\text{MFD}/\lambda_{cc}+12.1+1.0 \qquad (45),$$

and furthermore, with respect to $\Lambda_{nominal}$ that satisfies the following Formula (46), $\Lambda$ preferably satisfies the following Formula (47):

$$\Lambda_{nominal} \geq 2.34\text{MFD}/\lambda_{cc}+14.6+1.0 \qquad (46); \text{ and}$$

$$\Lambda_{nominal}-0.9 \leq \Lambda \leq \Lambda_{nominal}+0.9 \qquad (47).$$

This situation can be considered as an approximation of a case where the position of the core independently varies from the design center with Gaussian distribution of 3σ=0.9 µm being as a probability distribution. The probability that $\Lambda$ does not satisfy at least one of Formula (41) and Formula (43) is suppressed to 1% or less. Furthermore, $\Lambda$ preferably satisfies the following Formula (48):

$$\Lambda_{nominal}-0.7 \leq \Lambda \leq \Lambda_{nominal}+0.7 \qquad (48).$$

This situation can be considered as an approximation of a case where the position of each core independently varies from the design center with Gaussian distribution of 3σ=0.7 µm being as a probability distribution. The probability that $\Lambda$ does not satisfy at least one of Formula (41) and Formula (43) is suppressed to 0.1% or less. Furthermore, $\Lambda$ preferably satisfies the following Formula (49):

$$\Lambda_{nominal}-0.5 \leq \Lambda \leq \Lambda_{nominal}+0.5 \qquad (49).$$

This situation can be considered as an approximation of a case where the position of each core independently varies from the design center with Gaussian distribution of 3σ=0.5 µm being as a probability distribution. The probability that $\Lambda$ does not satisfy at least one of Formula (41) and Formula (43) is suppressed to 0.001% or less.

In the 12-core MCF having a square core arrangement, similar studies are given with regard to the relationship between the center-to-center interval $\Lambda$ between the adjacent cores and MFD/$\lambda_{cc}$, in a case where the parallel propagation XT after the propagation for 10 km at the wavelength of 1360 nm (corresponding to the fiber length of 10 km) is −20 dB. In order to set the parallel propagation XT after the propagation for 10 km at the wavelength of 1360 nm (corresponding to the fiber length of 10 km) to −20 dB or less, the center-to-center interval $\Lambda$ between the adjacent cores and MFD/$\lambda_{cc}$ satisfy at least one of the following Formula (50) and Formula (51):

$$\Lambda \geq 2.73\text{MFD}/\lambda_{cc}+12.7 \qquad (50); \text{ and}$$

$$\text{MFD}/\lambda_{cc} \leq 0.367\Lambda-4.66 \qquad (51),$$

and more preferably satisfy at least one of the following Formula (52) and Formula (53):

$$\Lambda \geq 2.73\text{MFD}/\lambda_{cc}+15.1 \qquad (52); \text{ and}$$

$$\text{MFD}/\lambda_{cc} \leq 0.367\Lambda-5.54 \qquad (53).$$

In order to allow the position of each core to vary from the design center, $\Lambda$ preferably takes a margin of 1 µm from the ranges of the above Formula (50) to Formula (53). Therefore, in a case where the nominal value of $\Lambda$ is set to $\Lambda_{nominal}$, $\Lambda$ satisfies, at least, the following Formula (54):

$$\Lambda_{nominal} \geq 2.73\text{MFD}/\lambda_{cc}+12.7+1.0 \qquad (54),$$

and additionally, with respect to $\Lambda_{nominal}$ that satisfies the following Formula (55), $\Lambda$ preferably satisfies the following Formula (56):

$$\Lambda_{nominal} \geq 2.73\text{MFD}/\lambda_{cc}+15.1+1.0 \qquad (55); \text{ and}$$

$$\Lambda_{nominal}-0.9 \leq \Lambda \leq \Lambda_{nominal}+0.9 \qquad (56).$$

This situation can be considered as an approximation of a case where the position of each core independently varies from the design center with Gaussian distribution of 3σ=0.9 µm being as a probability distribution. The probability that $\Lambda$ does not satisfy at least one of Formula (50) and Formula (52) is suppressed to 1% or less. Furthermore, $\Lambda$ preferably satisfies the following Formula (57):

$$\Lambda_{nominal}-0.7 \leq \Lambda \leq \Lambda_{nominal}+0.7 \qquad (57).$$

This situation can be considered as an approximation of a case where the position of each core independently varies from the design center with Gaussian distribution of 3σ=0.7 µm being as a probability distribution. The probability that $\Lambda$ does not satisfy at least one of Formula (50) and Formula (52) is suppressed to 0.1% or less. Furthermore, $\Lambda$ preferably satisfies the following Formula (58):

$$\Lambda_{nominal}-0.5 \leq \Lambda \leq \Lambda_{nominal}+0.5 \qquad (58).$$

This situation can be considered as an approximation of a case where the position of each core independently varies from the design center with Gaussian distribution of 3σ=0.5 µm being as a probability distribution. The probability that $\Lambda$ does not satisfy at least one of Formula (50) and Formula (52) is suppressed to 0.001% or less.

Figure 10:
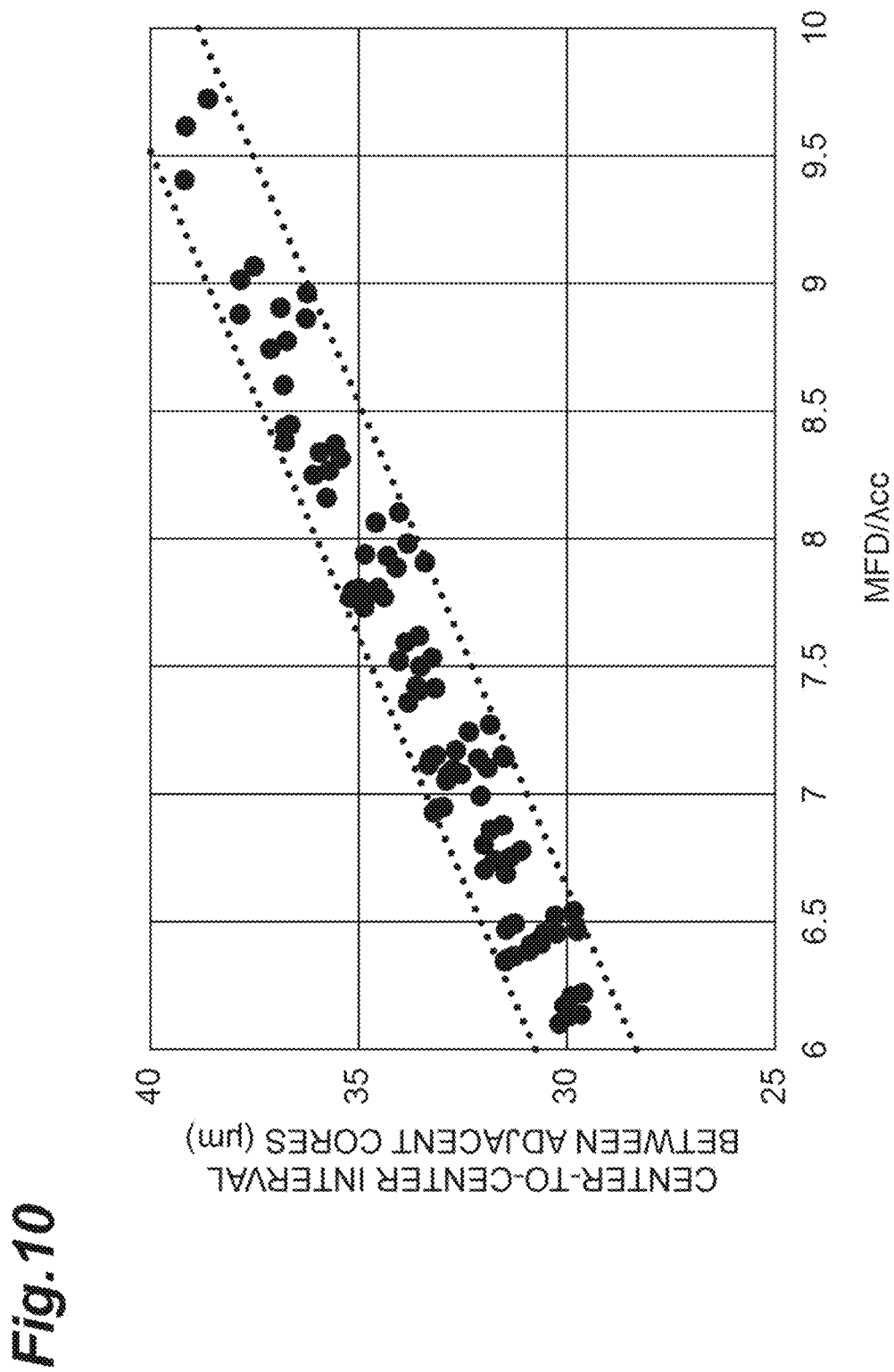
FIG. 10 is a graph illustrating a relationship between the center-to-center interval $\Lambda$ between the adjacent cores and MFD/$\lambda_{cc}$ of a case where the counter propagation XT at the wavelength of 1360 nm after the propagation for 10 km (corresponding to the fiber length of 10 km) is −40 dB (=−40 dB/10 km), in the 12-core MCF.

FIG. 10 is a graph illustrating a relationship between the center-to-center interval $\Lambda$ between the adjacent cores and MFD/$\lambda_{cc}$ in a case where the counter propagation XT at the wavelength of 1360 nm after the propagation for 10 km (corresponding to the fiber length of 10 km) is −40 dB (=−40 dB/10 km), in the 12-core MCF having the square core arrangement.

In order to set the counter propagation XT after the propagation for 10 km at the wavelength of 1360 nm to −40 dB or less, the center-to-center interval $\Lambda$ between the adjacent cores and MFD/$\lambda_{cc}$ satisfy at least one of the following Formula (59) and Formula (60) (a region above a lower dotted line in FIG. 10):

$$\Lambda \geq 2.63\text{MFD}/\lambda_{cc}+12.5 \qquad (59); \text{ and}$$

$$\text{MFD}/\lambda_{cc} \leq 0.380\Lambda-4.77 \qquad (60),$$

and more preferably satisfies at least one of the following Formula (61) and Formula (62) (a region above an upper dotted line in FIG. 10):

$$\Lambda \geq 2.63\text{MFD}/\lambda_{cc}+15.0 \qquad (61); \text{ and}$$

$$\text{MFD}/\lambda_{cc} \leq 0.380\Lambda-5.69 \qquad (62).$$

In order to allow the position of each core to vary from the design center, $\Lambda$ preferably takes a margin of at least 1 µm from the ranges of the above Formulas (59) to (62). Therefore, with respect to the nominal value $\Lambda_{nominal}$ of such $\Lambda$, $\Lambda$ satisfies, at least, the following Formula (63):

$$\Lambda_{nominal} \geq 2.63\text{MFD}/\lambda_{cc}+12.5+1.0 \qquad (63).$$

Furthermore, with respect to $\Lambda_{nominal}$ that satisfies the following Formula (64), $\Lambda$ preferably satisfies the following Formula (65):

$$\Lambda_{nominal} \geq 2.63 MFD/\lambda_{cc} + 15.0 + 1.0 \quad (64); \text{ and}$$

$$\Lambda_{nominal} - 0.9 \leq \Lambda \leq \Lambda_{nominal} + 0.9 \quad (65).$$

This case can be considered as an approximation of a case where the position of each core independently varies from the design center with Gaussian distribution of $3\sigma = 0.9$ μm being as a probability distribution. The probability that $\Lambda$ does not satisfy at least one of Formula (59) and Formula (61) is suppressed to 1% or less. Furthermore, a case where the following Formula (66):

$$\Lambda_{nominal} - 0.7 \leq \Lambda \leq \Lambda_{nominal} + 0.7 \quad (66)$$

is satisfied can be considered as an approximation of a case where the position of each core independently varies from the design center with Gaussian distribution of $3\sigma = 0.7$ μm being as a probability distribution. In this situation, the probability that $\Lambda$ does not satisfy at least one of Formula (59) and Formula (61) is suppressed to 0.1% or less. Furthermore, a case where the following Formula (67):

$$\Lambda_{nominal} - 0.5 \leq \Lambda \leq \Lambda_{nominal} + 0.5 \quad (67)$$

is satisfied can be considered as an approximation of a case where the position of each core independently varies from the design center with Gaussian distribution of $3\sigma = 0.5$ μm being as a probability distribution. In this situation, the probability that $\Lambda$ does not satisfy at least one of Formula (59) and Formula (61) is suppressed to 0.001% or less.

In the 12-core MCF having the square core arrangement, similar studies are given with regard to the relationship between the center-to-center interval $\Lambda$ between the adjacent cores and $MFD/\lambda_{cc}$, in a case where the parallel propagation XT after the propagation for 10 km at the wavelength of 1360 nm is −40 dB. In order to set the parallel propagation XT after the propagation for 10 km at the wavelength of 1360 nm to −40 dB or less, the center-to-center interval $\Lambda$ between the adjacent cores and $MFD/\lambda_{cc}$ preferably satisfy at least one of the following Formula (68) and Formula (69) (a region above a lower dotted line in FIG. 10):

$$\Lambda \geq 3.31 MFD/\lambda_{cc} + 12.6 \quad (68); \text{ and}$$

$$MFD/\lambda_{cc} \leq 0.377\Lambda - 4.75 \quad (69);$$

and more preferably satisfy at least one of the following Formula (70) and Formula (71) (a region above an upper dotted line in FIG. 10):

$$\Lambda \geq 3.31 MFD/\lambda_{cc} + 15.0 \quad (70); \text{ and}$$

$$MFD/\lambda_{cc} \leq 0.377\Lambda - 5.66 \quad (71).$$

In order to allow the position of each core to vary from the design center, $\Lambda$ preferably takes a margin of at least 1 μm from the ranges of the above Formulas (68) to (71). Therefore, with respect to the nominal value $\Lambda_{nominal}$ of such $\Lambda$, $\Lambda$ satisfies, at least, the following Formula (72):

$$\Lambda_{nominal} \geq 3.31 MFD/\lambda_{cc} + 12.6 + 1.0 \quad (72).$$

Furthermore, with respect to $\Lambda_{nominal}$ that satisfies the following Formula (73), $\Lambda$ preferably satisfies the following Formula (74):

$$\Lambda_{nominal} \geq 3.31 MFD/\lambda_{cc} + 15.0 + 1.0 \quad (73); \text{ and}$$

$$\Lambda_{nominal} - 0.9 \leq \Lambda \leq \Lambda_{nominal} + 0.9 \quad (74).$$

This situation can be considered as an approximation of a case where the position of each core independently varies from the design center with Gaussian distribution of $3\sigma = 0.9$ μm being as a probability distribution. In this situation, the probability that $\Lambda$ does not satisfy at least one of Formula (68) and Formula (70) is suppressed to 1% or less. Furthermore, a case where the following Formula (75):

$$\Lambda_{nominal} - 0.7 \leq \Lambda \leq \Lambda_{nominal} + 0.7 \quad (75)$$

is satisfied can be considered as an approximation of a case where the position of each core independently varies from the design center with Gaussian distribution of $3\sigma = 0.7$ μm being as a probability distribution. In this situation, the probability that $\Lambda$ does not satisfy at least one of Formula (68) and Formula (70) is suppressed to 0.1% or less. Furthermore, a case where the following Formula (76):

$$\Lambda_{nominal} - 0.5 \leq \Lambda \leq \Lambda_{nominal} + 0.5 \quad (76)$$

is satisfied can be considered as an approximation of a case where the position of each core independently varies from the design center with Gaussian distribution of $3\sigma = 0.5$ μm being as a probability distribution. In this situation, the probability that $\Lambda$ does not satisfy at least one of Formula (68) and Formula (70) is suppressed to 0.001% or less.

Figure 11:
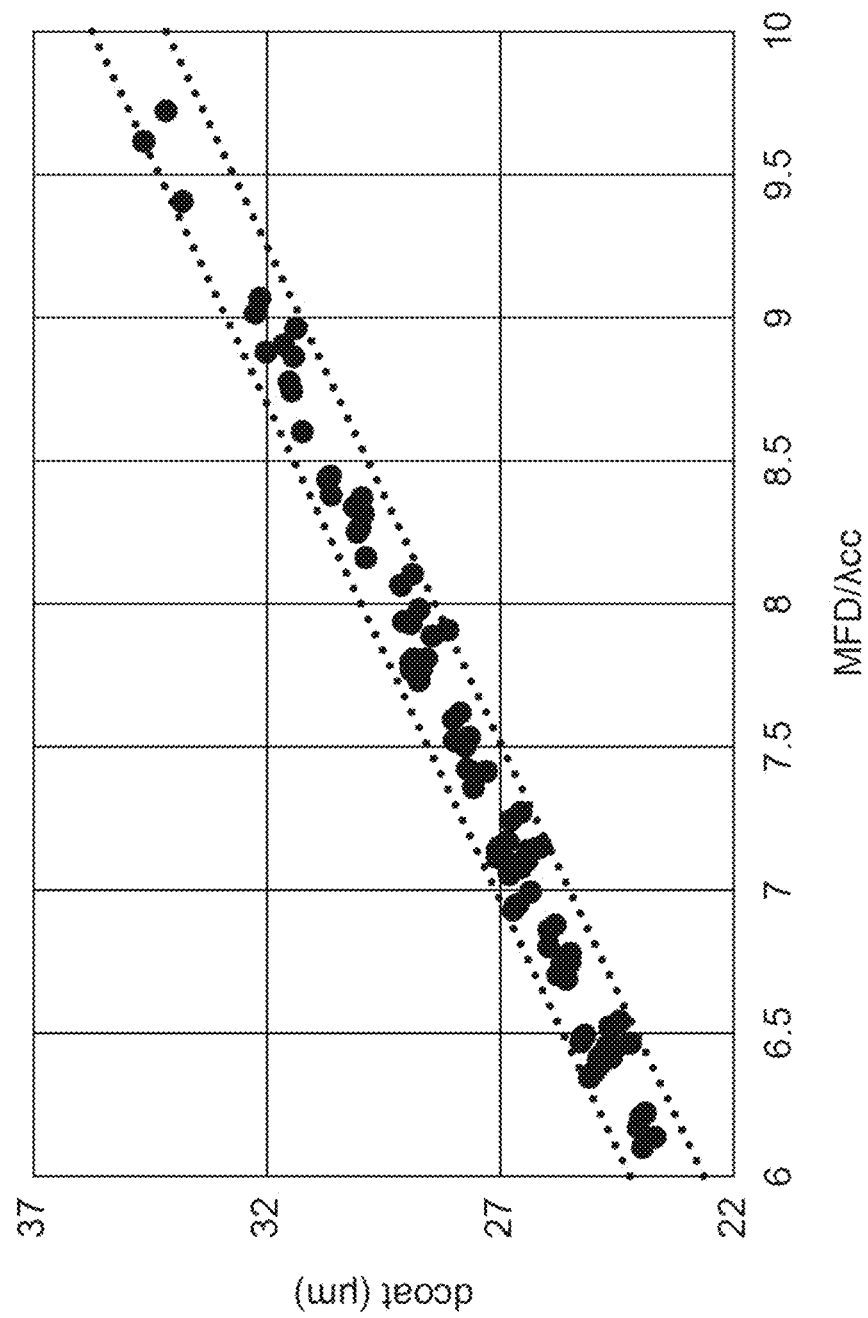
FIG. 11 is a graph illustrating a relationship between $d_{coat}$ and MFD/$\lambda_{cc}$ of a case where a leakage loss to the coating at the wavelength of 1360 nm is 0.01 dB/km, in the 12-core MCF.

FIG. 11 is a graph illustrating a relationship between $d_{coat}$ and $MFD/\lambda_{cc}$ of a case where a leakage loss to the coating at the wavelength of 1360 nm is 0.01 dB/km, in the 12-core MCF.

In order to set the leakage loss to the coating at the wavelength of 1360 nm to 0.01 dB/km, $d_{coat}$ and $MFD/\lambda_{cc}$ satisfy at least one of the following Formula (77) and Formula (78) (a region above a lower dotted line in FIG. 11):

$$d_{coat} \geq 2.88 MFD/\lambda_{cc} + 5.36 \quad (77); \text{ and}$$

$$MFD/\lambda_{cc} \leq 0.347 d_{coat} - 1.86 \quad (78),$$

and more preferably satisfies at least one of the following Formula (79) and Formula (80) (a region above an upper dotted line in FIG. 11):

$$d_{coat} \geq 2.88 MFD/\lambda_{cc} + 6.95 \quad (79); \text{ and}$$

$$MFD/\lambda_{cc} \leq 0.347 d_{coat} - 2.41 \quad (80).$$

The $d_{coat}$ of the outermost core (that is, the minimum value of $d_{coat}$) is generally referred to as an outer cladding thickness (OCT). However, $d_{coat}$ according to the present disclosure is defined as a value that can be defined for each core.

In order to allow the position of each core to vary from the design center and to allow the cladding diameter to vary from the design center, $d_{coat}$ preferably takes a margin of at least 1 μm from the ranges of the above Formulas (77) to (80). Therefore, regarding $d_{coat}$, the nominal value $CD_{nominal}$ of the cladding diameter for the nominal value $d_{coat,nominal}$ of such $d_{coat}$ preferably has a range that satisfies at least the following Formula (81):

$$d_{coat,nominal} \geq 2.88 MFD/\lambda_{cc} + 5.36 + 1.0 \quad (81)$$

and that also satisfies the following Formula (82):

$$d_{coat,nominal} \geq 2.88 MFD/\lambda_{cc} + 6.95 + 1.0 \quad (82).$$

In this situation, in a case where both the following Formulas (83) and (84):

$$\Lambda_{nominal} - 0.9 \leq \Lambda \leq \Lambda_{nominal} + 0.9 \quad (83); \text{ and}$$

$$CD_{nominal} - 0.9 \leq CD \leq CD_{nominal} + 0.9 \quad (84)$$

are satisfied, the probability that $d_{coat}$ does not satisfy at least one of Formula (77) and Formula (79) is suppressed to 1% or less. In addition, in a case where both the following Formulas (85) and (86):

$$\Lambda_{nominal}-0.7 \leq \Lambda \leq \Lambda_{nominal}+0.7 \quad (85); \text{ and}$$

$$CD_{nominal}-0.7 \leq CD \leq CD_{nominal}+0.7 \quad (86)$$

are satisfied, the probability that $d_{coat}$ does not satisfy at least one of Formula (77) and Formula (79) is suppressed to 0.1% or less. Further, regarding $d_{coat}$, in a case where both the following Formulas (87) and (88):

$$\Lambda_{nominal}-0.5 \leq \Lambda \leq \Lambda_{nominal}+0.5 \quad (87); \text{ and}$$

$$CD_{nominal}-0.5 \leq CD \leq CD_{nominal}+0.5 \quad (88)$$

are satisfied, the probability that $d_{coat}$ does not satisfy at least one of Formula (77) and Formula (79) is suppressed to 0.001% or less.

Figure 12:
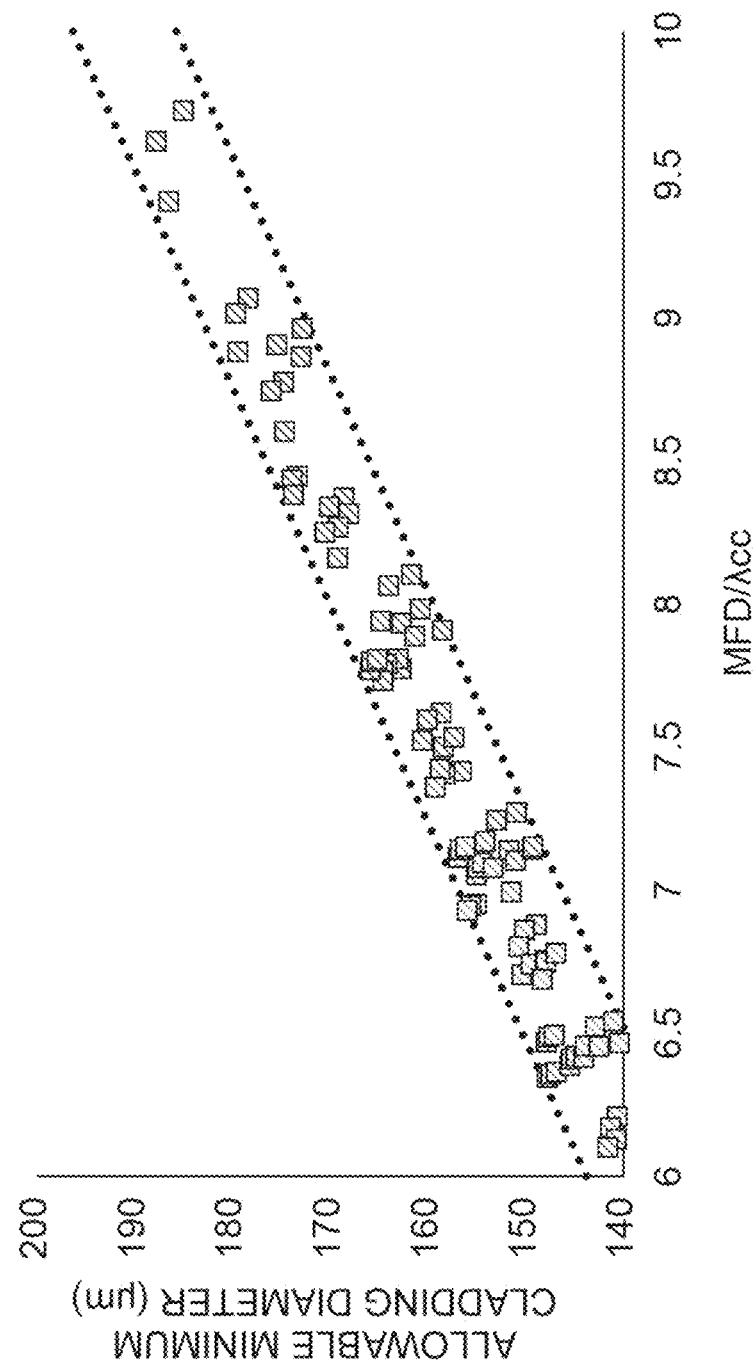
FIG. 12 is a graph illustrating a relationship between a CD (an allowable minimum cladding diameter) and MFD/$\lambda_{cc}$ of a case where a margin of 1 μm is added to $d_{coat}$, when the leakage loss to the coating at the wavelength of 1360 nm is 0.01 dB/km, and the margin of 1 μm is added to $\Lambda$, when the counter propagation XT at the wavelength of 1360 nm after the propagation for 10 km (corresponding to the fiber length of 10 km) is −20 dB (=−20 dB/10 km), in the 12-core MCF.

FIG. 12 is a graph illustrating a relationship between a CD (an allowable minimum cladding diameter) and MFD/$\lambda_{cc}$ of a case where a margin of 1 μm is added to $d_{coat}$, when the leakage loss to the coating at the wavelength of 1360 nm is 0.01 dB/km, and the margin of 1 μm is added to Λ, when the counter propagation XT at the wavelength of 1360 nm after the propagation for 10 km (corresponding to the fiber length of 10 km) is −20 dB (=−20 dB/10 km), in the 12-core MCF (the square core arrangement). Note that in FIG. 12, in a case where x axis indicates MFD/$\lambda_{cc}$ and y axis indicates CD, a dotted line on an upper side is given by y=13.15x+64.88 (x=7.606×10$^{-2}$y−4.935), and a dotted line on a lower side is given by y=13.15x+54.25 (x=7.606×10$^{-2}$y−4.126).

In consideration of tolerance of the position of each core and the dimension of the outer diameter of the cladding, in order to set the leakage loss to the coating at the wavelength of 1360 nm to 0.01 dB/km or less and to set the counter propagation XT after the propagation for 10 km to −20 dB or less, the relationship between $CD_{nominal}$ and MFD/$\lambda_{cc}$ satisfies at least one of the following Formula (89) and Formula (90) (a region above a dotted line on a lower side in FIG. 12):

$$CD_{nominal} \geq 13.15 MFD/\lambda_{cc}+54.25 \quad (89); \text{ and}$$

$$MFD/\lambda_{cc} \leq 0.07606 CD_{nominal}-4.126 \quad (90),$$

and more preferably satisfies at least one of the following Formula (91) and Formula (92) (a region from a dotted line on an upper side in FIG. 12):

$$CD_{nominal} \geq 13.15 MFD/\lambda_{cc}+64.88 \quad (91); \text{ and}$$

$$MFD/\lambda_{cc} \leq 0.07606 CD_{nominal}-4.935 \quad (92).$$

Figure 13:
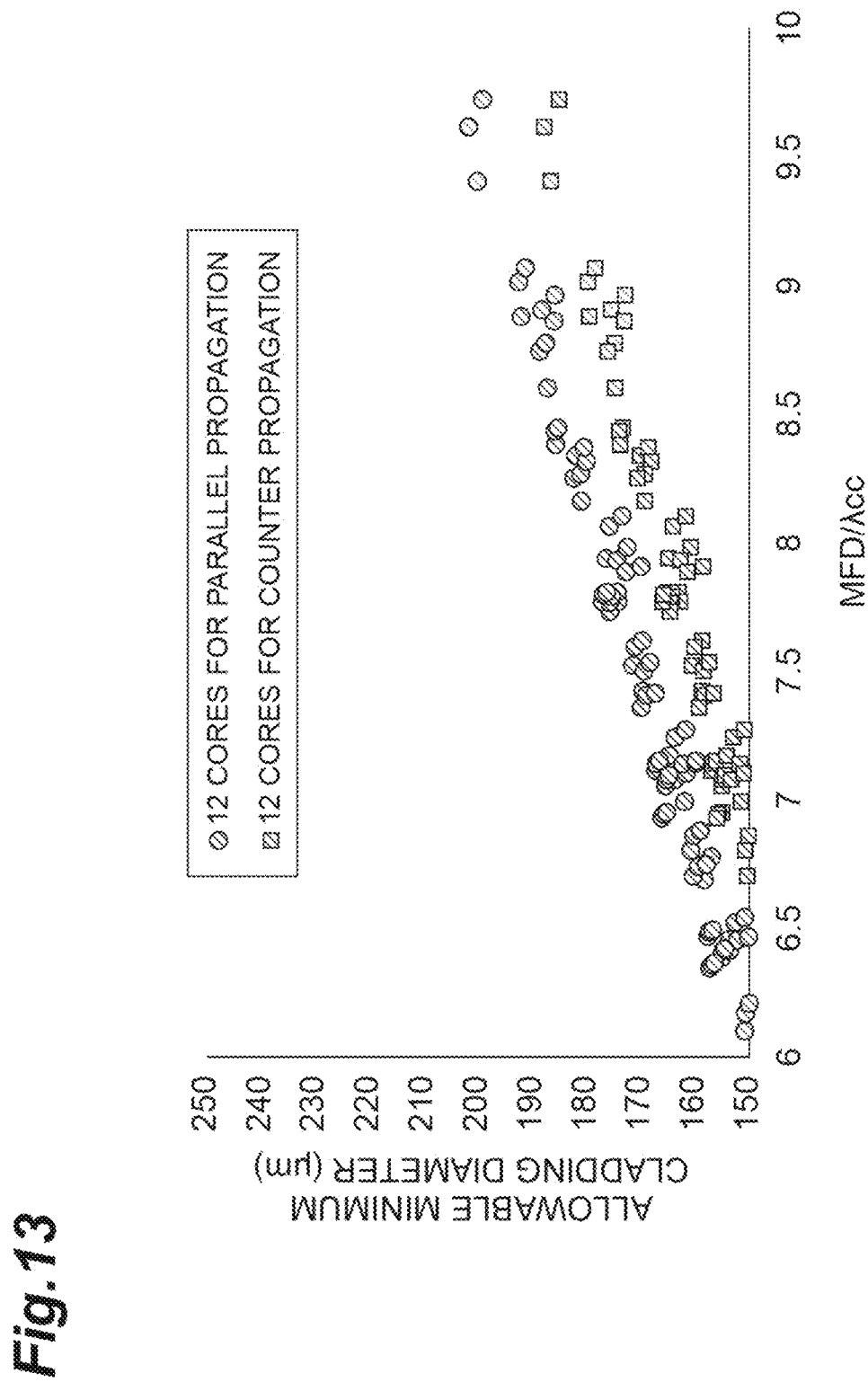
FIG. 13 is a graph illustrating a relationship between the CD (the allowable minimum cladding diameter) and MFD/$\lambda_{cc}$ of a case where a margin of 1 μm is added to $d_{coat}$ and the margin of 1 μm is added to Λ, when the leakage loss to the coating at the wavelength of 1360 nm is 0.01 dB/km, in the case of the 12-core MCF, under a condition that the counter propagation XT at the wavelength of 1360 nm after the propagation for 10 km (corresponding to the fiber length of 10 km) is −20 dB (=−20 dB/10 km) or parallel propagation XT (an XT at general propagation in an identical direction) after the propagation for 10 km (corresponding to the fiber length of 10 km) is −20 dB (=−20 dB/10 kin)

FIG. 13 is a graph illustrating a relationship between the CD (the allowable minimum cladding diameter) and MFD/$\lambda_{cc}$ of a case where a margin of 1 μm is added to $d_{coat}$ and the margin of 1 μm is added to Λ, when the leakage loss to the coating at the wavelength of 1360 nm is 0.01 dB/km, in the case of the 12-core MCF (the square core arrangement), under a condition that the counter propagation XT at the wavelength 1360 nm after the propagation for 10 km (corresponding to the fiber length of 10 km) is −20 dB (=−20 dB/10 km) or the parallel propagation XT (XT at the time of general propagation in the identical direction) after the propagation for 10 km (corresponding to the fiber length of 10 km) is −20 dB (=−20 dB/10 km). Note that in FIG. 13, the above-described relationships are illustrated such that a symbol "● (indicated by hatching in FIG. 13)" represents a relationship in the 12-core MCF for the parallel propagation between the adjacent cores, and a symbol "■ (indicated by hatching in FIG. 13)" represents a relationship in the 12-core MCF for the counter propagation between the adjacent cores.

As can be understood from FIG. 13, the counter propagation is desirable in the transmission method, instead of the parallel propagation, because the CD can be reduced by a little more than 10 μm.

Although no dotted line is illustrated in FIG. 13, in order to set the parallel propagation XT after the propagation for 10 km to −20 dB or less in a similar manner to the above-described case of FIG. 12, in the 12-core MCF having the square core arrangement, the relationship between $CD_{nominal}$ and MFD/$\lambda_{cc}$ preferably satisfies at least one of the following Formula (93) and Formula (94):

$$CD_{nominal} \geq 14.38 MFD/\lambda_{cc}+56.03 \quad (93); \text{ and}$$

$$MFD/\lambda_{cc} \leq 0.06954 CD_{nominal}-3.896 \quad (94),$$

and more preferably satisfies at least one of the following Formula (95) and Formula (96):

$$CD_{nominal} \geq 14.38 MFD/\lambda_{cc}+66.47 \quad (95); \text{ and}$$

$$MFD/\lambda_{cc} \leq 0.06954 CD_{nominal}-4.622 \quad (96).$$

In a case where the $CD_{nominal}$ is 195 μm, 190 μm, 185 μm, 180 μm, 175 μm, or 170 μm, in the 12-core MCF, in consideration of the tolerance in dimensions of the core position and the cladding diameter, in order to set the leakage loss to the resin coating at the wavelength of 1360 nm to 0.01 dB/km or less and to set the counter propagation XT to −20 dB or less after the propagation for 10 km (corresponding to the fiber length of 10 km), MFD/$\lambda_{cc}$ is preferably 9.66 or less, 9.32 or less, 8.97 or less, 8.62 or less, 8.27 or less, or 7.93 or less in the order of numerical values of the $CD_{nominal}$ as listed above, and is more preferably 8.94 or less, 8.59 or less, 8.24 or less, 7.89 or less, 7.55 or less, or 7.20 or less in the order of the numerical values of the $CD_{nominal}$ as listed above.

In a case where the $CD_{nominal}$ is 195 μm, 190 μm, 185 μm, 180 μm, 175 μm, or 170 μm, in the 12-core MCF, in consideration of the tolerance in the dimensions of the core position and the cladding diameter, in order to set the leakage loss to the resin coating at the wavelength of 1360 nm to 0.01 dB/km or less and to set the counter propagation XT to −20 dB or less after the propagation for 10 km (corresponding to the fiber length of 10 km), MFD/$\lambda_{cc}$ is preferably 10.71 or less, 10.33 or less, 9.94 or less, 9.56 or less, 9.18 or less, or 8.80 or less in the order of the numerical values of the $CD_{nominal}$ as listed above, and is more preferably 9.90 or less, 9.52 or less, 9.14 or less, 8.76 or less, 8.38 or less, or 8.00 or less in the order of the numerical values of the $CD_{nominal}$ as listed above.

Figure 14:
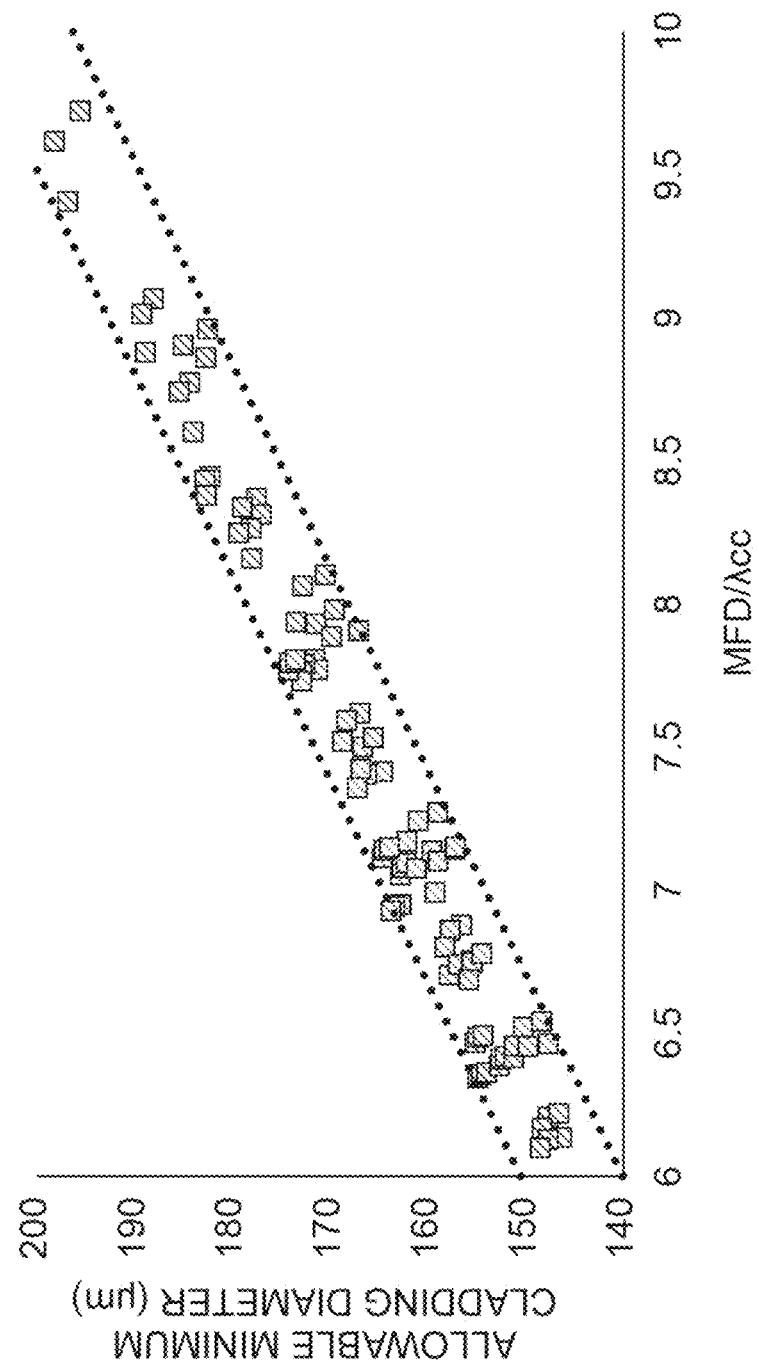
FIG. 14 is a graph illustrating a relationship between the CD (the allowable minimum cladding diameter) and MFD/$\lambda_{cc}$ of a case where a margin of 1 μm is added to $d_{coat}$, when the leakage loss to the coating at the wavelength of 1360 nm is 0.01 dB/km and the margin of 1 μm is added to Λ, when the counter propagation XT at the wavelength of 1360 nm after the propagation for 10 km (corresponding to the fiber length of 10 km) is −40 dB (=−40 dB/10 km), in the 12-core MCF.

FIG. 14 is a graph illustrating a relationship between the CD (the allowable minimum cladding diameter) and MFD/$\lambda_{cc}$ of a case where a margin of 1 μm is added to $d_{coat}$, when the leakage loss to the coating at the wavelength of 1360 nm is 0.01 dB/km and the margin of 1 μm is added to Λ, when the counter propagation XT at the wavelength of 1360 nm after the propagation for 10 km (corresponding to the fiber length of 10 km) is −40 dB (=−40 dB/10 km), in the 12-core MCF (the square core arrangement). Note that in FIG. 14, in a case where x axis indicates MFD/$\lambda_{cc}$ and y axis indicates CD, a dotted line on an upper side is given by y=14.07x+66.07 (x=7.105×10$^{-2}$y−4.694), and a dotted line on a lower side is given by y=14.07x+55.59 (x=7.105×10$^{-2}$y−3.950).

In consideration of tolerance of the position of each core and the dimension of the outer diameter of the cladding, in order to set the leakage loss to the coating at the wavelength of 1360 nm to 0.01 dB/km or less and to set the counter propagation XT after the propagation for 10 km to −40 dB or less, the relationship between $CD_{nominal}$ and $MFD/\lambda_{cc}$ satisfies at least one of the following Formula (97) and Formula (98) (a region above a dotted line on a lower side in FIG. 14):

$$CD_{nominal} \geq 14.07 MFD/\lambda_{cc} + 55.59 \quad (97); \text{ and}$$

$$MFD/\lambda_{cc} \leq 0.07105 CD_{nominal} - 3.950 \quad (98),$$

and more preferably satisfies at least one of the following Formula (99) and Formula (100) (a region from a dotted line on an upper side in FIG. 14):

$$CD_{nominal} \geq 14.07 MFD/\lambda_{cc} + 66.07 \quad (99); \text{ and}$$

$$MFD/\lambda_{cc} \leq 0.07105 CD_{nominal} - 4.694 \quad (100).$$

Figure 15:
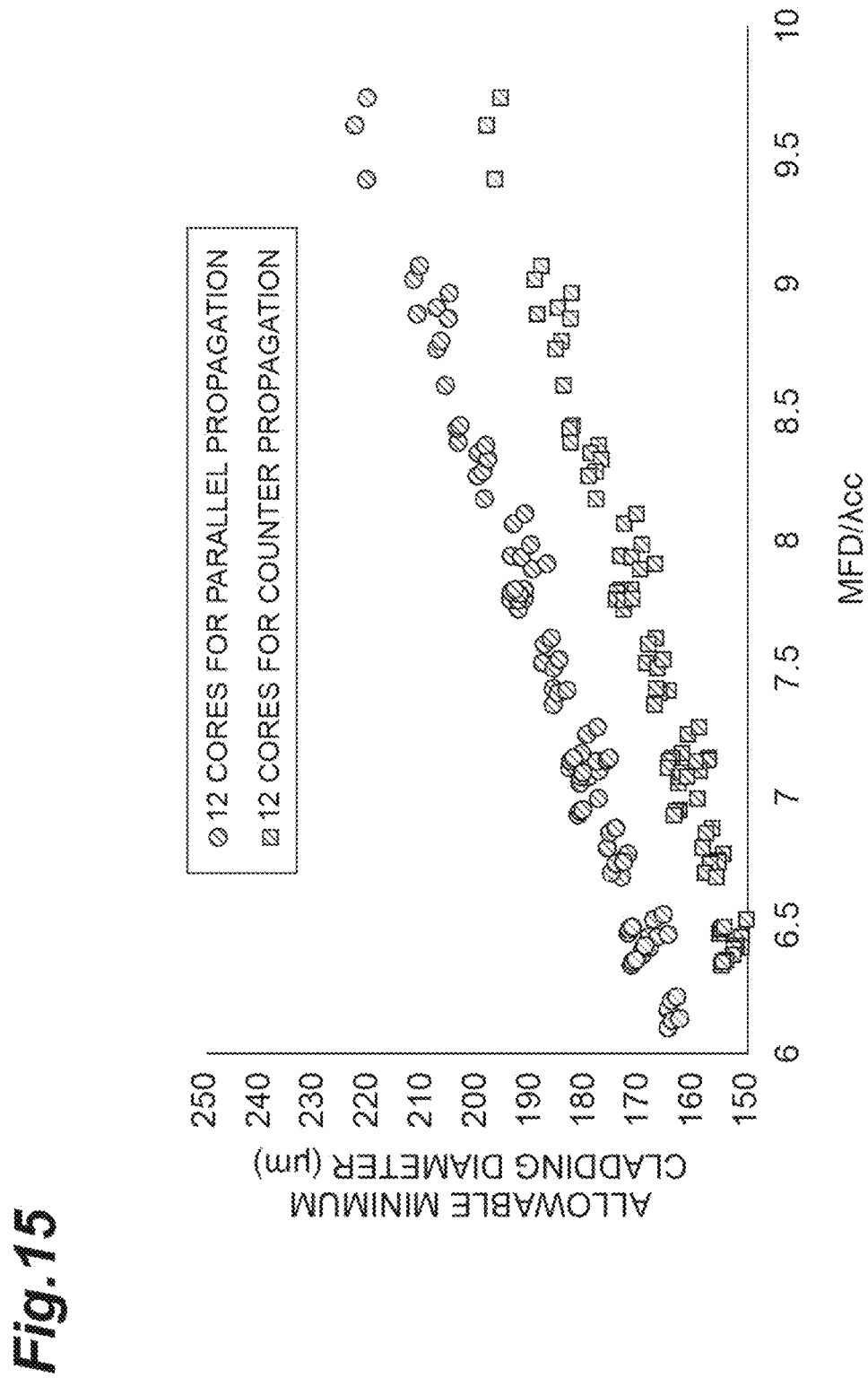
FIG. 15 is a graph illustrating a relationship between the CD (the allowable minimum cladding diameter) and MFD/$\lambda_{cc}$ of a case where a margin of 1 μm is added to $d_{coat}$ and the margin of 1 μm is added to Λ, when the leakage loss to the coating at the wavelength of 1360 nm is 0.01 dB/km, in the case of the 12-core MCF, under a condition that the counter propagation XT at the wavelength of 1360 nm after the propagation for 10 km (corresponding to the fiber length of 10 km) is −40 dB (=−40 dB/10 km) or the parallel propagation XT after the propagation for 10 km (corresponding to the fiber length of 10 km) is −40 dB (=−40 dB/10 km).

FIG. 15 is a graph illustrating a relationship between the CD (the allowable minimum cladding diameter) and $MFD/\lambda_{cc}$ of a case where a margin of 1 μm is added to $d_{coat}$ and the margin of 1 μm is added to Λ, when the leakage loss to the coating at the wavelength of 1360 nm is 0.01 dB/km, in the case of the 12-core MCF (the square core arrangement), under a condition that the counter propagation XT at the wavelength of 1360 nm after the propagation for 10 km (corresponding to the fiber length of 10 km) is −40 dB (=−40 dB/10 km) or the parallel propagation XT after the propagation for 10 km (corresponding to the fiber length of 10 km) is −40 dB (=−40 dB/10 km). Note that in FIG. 15, the above-described relationships are illustrated such that a symbol "● (indicated by hatching in FIG. 15)" represents a relationship in the 12-core MCF for the parallel propagation between the adjacent cores, and a symbol "■ (indicated by hatching in FIG. 15)" represents a relationship in the 12-core MCF for the counter propagation between the adjacent cores.

Although no dotted line is illustrated in FIG. 15, in order to set the parallel propagation XT after the propagation for 10 km to −40 dB or less in a similar manner to the above-described case of FIG. 12 or the like, in the 12-core MCF having the square core arrangement, the relationship between $CD_{nominal}$ and $MFD/\lambda_{cc}$ preferably satisfies at least one of the following Formula (101) and Formula (102):

$$CD_{nominal} \geq 16.24 MFD/\lambda_{cc} + 58.71 \quad (101); \text{ and}$$

$$MFD/\lambda_{cc} \leq 0.06159 CD_{nominal} - 3.616 \quad (102)$$

and more preferably satisfies at least one of the following Formula (103) and Formula (104):

$$CD_{nominal} \geq 16.24 MFD/\lambda_{cc} + 68.86 \quad (103); \text{ and}$$

$$MFD/\lambda_{cc} \leq 0.06159 CD_{nominal} - 4.241 \quad (104).$$

In a case where the $CD_{nominal}$ is 195 μm, 190 μm, 185 μm, 180 μm, 175 μm, or 170 μm, in the 12-core MCF, in consideration of the tolerance in the dimensions of the core position and the cladding diameter, in order to set the leakage loss to the resin coating at the wavelength of 1360 nm to 0.01 dB/km or less and to set the counter propagation XT to −40 dB or less after the propagation for 10 km (corresponding to the fiber length of 10 km), $MFD/\lambda_{cc}$ is preferably 8.39 or less, 8.09 or less, 7.78 or less, 7.47 or less, 7.16 or less, or 6.85 or less in the order of the numerical values of the $CD_{nominal}$ as listed above, and is more preferably 7.77 or less, 7.46 or less, 7.15 or less, 6.85 or less, 6.54 or less, or 6.23 or less in the order of the numerical values of the $CD_{nominal}$ as listed above.

In the case where the $CD_{nominal}$ is 195 μm, 190 μm, 185 μm, 180 μm, 175 μm, or 170 μm, in the 12-core MCF, in consideration of the tolerance in the dimensions of the core position and the cladding diameter, in order to set the leakage loss to the resin coating at the wavelength of 1360 nm to 0.01 dB/km or less and to set the counter propagation XT to −40 dB or less after the propagation for 10 km (corresponding to the fiber length of 10 km), $MFD/\lambda_{cc}$ is preferably 9.91 or less, 9.55 or less, 9.19 or less, 8.84 or less, 8.48 or less, or 8.13 or less in the order of the numerical values of the $CD_{nominal}$ as listed above, and is more preferably 9.16 or less, 8.80 or less, 8.45 or less, 8.09 or less, 7.74 or less, or 7.38 or less in the order of the numerical values of the $CD_{nominal}$ as listed above.

It is preferable that $\lambda_{cc}$ is 1260 nm or less, because a single mode operation on the O-band can be ensured. In this situation, setting $MFD/\lambda_{cc}$ to 6.2 or more is preferable, because $\lambda_{cc}$ of 1260 nm or less and MFD that falls within a range of 7.8 μm or more and 8.6 μm or less with 8.2 μm used as a reference are both achievable. Setting $MFD/\lambda_{cc}$ to 6.5 or more is more preferable, because $\lambda_{cc}$ of 1260 nm or less and MFD that falls within a range of 8.2 μm or more and 9.0 μm or less with 8.6 μm used as a reference are both achievable.

In addition, $\lambda_{cc}$ is preferably 1360 nm or less. In this situation, a higher-order mode propagates 22 m or more on the O-band. However, it is preferable that unless the local bending or splicing at a short haul is repeated, the single mode operation can be practically ensured, and the base mode is more strongly confined in the core. Further, setting $MFD/\lambda_{cc}$ to 6.0 or more is more preferable, because $\lambda_{cc}$ of 1360 nm or less and MFD that falls within a range of 8.2 μm or more and 9.0 μm or less with 8.6 μm used as a reference are both achievable.

In these cases, $MFD/\lambda_{cc}$ preferably takes a value between an upper limit defined from the $CD_{nominal}$ described above and a lower limit defined from the range of MFD and $\lambda_{cc}$.

In a case where the nominal value of MFD is used as $MFD_{nominal}$, the tolerance falls within a range of a value of $MFD_{nominal} - 0.4$ μm or more and a value of $MFD_{nominal} + 0.4$ μm or less, and in a case where the nominal value of the zero-dispersion wavelength $\lambda_0$ is used as $\lambda_{0nominal}$, the tolerance falls within a range of a value of $\lambda_{0nominal} - 12$ nm or more and a value of $\lambda_{0nominal} + 12$ nm or less, the value of $MFD/\lambda_{cc}$ becomes a minimum when MFD is $MFD_{nominal} - 0.4$ μm and $\lambda_0$ is $\lambda_{0nominal} - 12$ nm, and becomes a maximum when the MFD is $MFD_{nominal} + 0.4$ μm and $\lambda_0$ is $\lambda_{0nominal} + 12$ nm. In this situation, regarding the "tolerance of $MFD/\lambda_{cc}$", an MCF structure is configured such that the difference between the upper limit value and the lower limit value of $MFD/\lambda_{cc}$ is preferably at least 1.9 or more, more preferably 2.5 or more, and further preferably 3.0 or more.

In practice, the parameter of the refractive index profile (a, b, Δ1, Δ2, Δ3, or $a_{ESI}$, $\Delta1_{ESI}$, $\Delta2_{ESI}$, or the like) of each core does not vary independently or randomly from the nominal value, but the refractive index profile of each core can be measured to adjust $a_{ESI}$ and b. Therefore, it is possible to reduce the tolerance of $MFD/\lambda_{cc}$. However, even in such a situation, an MCF structure in which the difference between the upper limit value and the lower limit value of $MFD/\lambda_{cc}$ is preferably 1.0 or more, and more preferably 1.5 or more. Accordingly, the yield of the MCF can be improved to a level with sufficient manufacturing performance.

In a case where $\lambda_{cc}$ of 1260 nm or less and MFD that falls within a range of 7.8 μm or more and 8.6 μm or less with 8.2 μm used as a reference are both achieved, $MFD/\lambda_{cc}$ becomes 6.2 or more. Therefore, in order to ensure that the tolerance of $MFD/\lambda_{cc}$ is 1.0 or more, 1.5 or more, 1.9 or more, 2.5 or more, or 3.0 or more, the MCF structure preferably allows the upper limit value of $MFD/\lambda_{cc}$, which is 7.2 or more, 7.7 or more, 8.1 or more, 8.7 or more, or 9.2 or more in the order of numerical values of the tolerance of MFD/$\lambda_{cc}$ as listed above. For this purpose, regarding $CD_{nominal}$, in the 12-core MCF, in order to set the leakage loss to the resin coating at the wavelength of 1360 nm is 0.01 dB/km or less and to set the counter propagation XT at the wavelength of 1360 nm is −20 dB or less after the propagation for 10 km (corresponding to the fiber length of 10 km), an allowable $CD_{nominal}$ of a case where a margin is added to Λ and $d_{coat}$ is preferably 149 μm or more, 156 μm or more, 161 μm or more, 169 μm or more, or 175 μm or more from Formula (89) in the order of the numerical values of the tolerance of MFD/$\lambda_{cc}$ as listed above, and is more preferably 160 μm or more, 166 μm or more, 171 μm or more, 179 μm or more, or 186 μm or more from Formula (91) in the order of numerical values of the tolerance of MFD/$\lambda_{cc}$ as listed above. In this situation, regarding $CD_{nominal}$, in the 12-core MCF, in order to set the leakage loss to the resin coating at the wavelength of 1360 nm to 0.01 dB/km or less and to set the counter propagation XT at the wavelength of 1360 nm to −40 dB or less after the propagation for 10 km (corresponding to the fiber length of 10 km), an allowable $CD_{nominal}$ of a case where a margin is added to Λ and $d_{coat}$ is preferably 157 μm or more, 164 μm or more, 170 μm or more, 178 μm or more, or 185 μm or more from Formula (97) in the order of the numerical values of the tolerance of MFD/$\lambda_{cc}$ as listed above, and is more preferably 167 μm or more, 174 μm or more, 173 μm or more, 182 μm or more, or 189 μm or more from Formula (99) in the order of numerical values of the tolerance of MFD/$\lambda_{cc}$ as listed above.

In a case where $\lambda_{cc}$ of 1260 nm or less and MFD that falls within a range of 8.2 μm or more and 9.0 μm or less with 8.6 μm used as a reference are both achieved, MFD/$\lambda_{cc}$ becomes 6.5 or more. Therefore, in order to ensure that the tolerance of MFD/$\lambda_{cc}$ is 1.0 or more, 1.5 or more, 1.9 or more, 2.5 or more, or 3.0 or more, the MCF structure preferably allows the upper limit value of MFD/$\lambda_{cc}$, which is 7.5 or more, 8.0 or more, 8.4 or more, 9.0 or more, or 9.5 or more in the order of numerical values of the tolerance of MFD/$\lambda_{cc}$ as listed above. For this purpose, regarding $CD_{nominal}$, in the 12-core MCF, in order to set the leakage loss to the resin coating at the wavelength of 1360 nm is 0.01 dB/km or less and to set the counter propagation XT at the wavelength of 1360 nm is −20 dB or less after the propagation for 10 km (corresponding to the fiber length of 10 km), an allowable $CD_{nominal}$ of a case where a margin is added to Λ and $d_{coat}$ is preferably 153 μm or more, 159 μm or more, 165 μm or more, 173 μm or more, or 179 μm or more from Formula (89) in the order of numerical values of the tolerance of MFD/$\lambda_{cc}$ as listed above, and is more preferably 163 μm or more, 170 μm or more, 175 μm or more, 183 μm or more, or 190 μm or more from Formula (91) in the order of numerical values of the tolerance of MFD/$\lambda_{cc}$ as listed above. In this situation, regarding $CD_{nominal}$, in the 12-core MCF, in order to set the leakage loss to the resin coating at the wavelength of 1360 nm is 0.01 dB/km or less and to set the counter propagation XT at the wavelength of 1360 nm is −40 dB or less after the propagation for 10 km (corresponding to the fiber length of 10 km), an allowable $CD_{nominal}$ of a case where a margin is added to Λ and $d_{coat}$ is preferably 161 μm or more, 168 μm or more, 174 μm or more, 182 μm or more, or 189 μm or more from Formula (97) in the order of numerical values of the tolerance of MFD/$\lambda_{cc}$ as listed above, and is more preferably 172 μm or more, 179 μm or more, 184 μm or more, 193 μm or more, or 199 μm or more from Formula (99) in the order of numerical values of the tolerance of MFD/$\lambda_{cc}$ as listed above.

In a case where $\lambda_{cc}$ of 1360 nm or less and MFD that falls within a range of 8.2 μm or more and 9.0 μm or less with 8.6 μm used as a reference are both achieved, MFD/$\lambda_{cc}$ becomes 6.0 or more. Therefore, in order to ensure that the tolerance of MFD/$\lambda_{cc}$ is at least 1.0, 1.5, 1.9, 2.5, or 3.0, the MCF structure preferably allows the upper limit value of the above MFD/$\lambda_{cc}$, which is at least 7.0, 7.5, 7.9, 8.5, or 9.0 in the order of numerical values of the tolerance of MFD/$\lambda_{cc}$ as listed above. For this purpose, regarding $CD_{nominal}$, in the 12-core MCF, in order to set the leakage loss to the resin coating at the wavelength of 1360 nm is 0.01 dB/km or less and to set the counter propagation XT at the wavelength of 1360 nm is −20 dB or less after the propagation for 10 km (corresponding to the fiber length of 10 km), an allowable $CD_{nominal}$ of a case where a margin is added to Λ and $d_{coat}$ is preferably 146 μm or more, 153 μm or more, 158 μm or more, 166 μm or more, or 173 μm or more from Formula (89) in the order of numerical values of the tolerance of MFD/$\lambda_{cc}$ as listed above, and is more preferably 157 μm or more, 164 μm or more, 169 μm or more, 177 μm or more, or 183 μm or more from Formula (91) in the order of numerical values of the tolerance of MFD/$\lambda_{cc}$ as listed above. In this situation, regarding $CD_{nominal}$, in the 12-core MCF, in order to set the leakage loss to the resin coating at the wavelength of 1360 nm is 0.01 dB/km or less and to set the counter propagation XT at the wavelength of 1360 nm is −40 dB or less after the propagation for 10 km (corresponding to the fiber length of 10 km), an allowable $CD_{nominal}$ of a case where a margin is added to Λ and $d_{coat}$ is preferably 154 μm or more, 161 μm or more, 167 μm or more, 175 μm or more, or 182 μm or more from Formula (97) in the order of numerical values of the tolerance of MFD/$\lambda_{cc}$ as listed above, and is more preferably 165 μm or more, 170 μm or more, 176 μm or more, 184 μm or more, or 191 μm or more from Formula (99) in the order of numerical values of the tolerance of MFD/$\lambda_{cc}$ as listed above.

In a case where $\lambda_{cc}$ is more than 1260 nm and 1360 nm or less, in the configuration of FIG. 12 (a fiber that is not formed into a cable) of ITU-T G.650.1 (March 2018), 20 m out of 22 m in a sample fiber is bent with a bending radius of 140 mm or more, one spool of bending with a radius of 40 mm is added before and after the above 20 m segment, and $P_h$ represents an intensity of the higher-order mode and $P_f$ represents an intensity of the base mode, when all modes are uniformly excited, a wavelength at which 10 $\log_{10}[P_h/(P_f+P_h)]=0.1$ dB is satisfied is measured as $\lambda_{cc}$. However, in the MCF according to the present disclosure, a cutoff wavelength ($\lambda_{ccR}$) is preferably 1260 nm or less, when measured by bending the segment of 20 m out of 22 m in the sample fiber with a radius of 60 mm or more and 100 mm or less that has been changed. Accordingly, the single mode operation on the O-band after cable installation can be ensured. In addition, the length $L_{sample}$ [in] of the sample fiber falls within a range of more than 22 m and 1000 m or less, $L_{sample}$−2 [m] is bent with a bending radius of 140 mm or more, and one spool of bending with a radius of 40 mm is added before and after the above $L_{sample}$−2 [m] segment. The cutoff wavelength ($\lambda_{ccL}$) that has been measured is preferably 1260 nm or less. Accordingly, in the cable having a cable length $L_{sample}$ [m], the single mode operation on the O-band can be ensured.

In each core of the MCF according to the present disclosure, a bending loss at the wavelength of 1310 nm or more and 1360 nm or less is preferably 0.15 dB/turn or less at a bending radius of 10 mm, and is more preferably 0.02 dB/turn or less. Accordingly, also in a case where the MCF according to the present disclosure is formed in an ultra-high density cable of the intermittent-bonding ribbon type, an increase in loss after being formed into a cable can be suppressed.

In a case where an MCF cable that incorporates the MCF according to the present disclosure is linearly extended (at least a bending radius of 1 m or more), an average bending radius of the MCF formed into the cable is preferably 0.14 m or less, and more preferably 0.10 m or less. In addition, regarding the MCF cable incorporating the MCF according to the present disclosure, an average bending radius of the MCF formed into the cable is preferably 0.14 m or more and 0.3 m or less. Accordingly, the XT can be reduced.

Further, regarding the MCF cable incorporating the MCF according to the present disclosure, the average bending radius of the MCF formed into the cable is preferably 0.03 m or more, and more preferably 0.06 m or more. Accordingly, a loss caused by bending can be reduced.

Furthermore, the MCF cable incorporating the MCF according to the present disclosure is preferably an intermittent-bonding ribbon cable. Accordingly, the intermittent-bonding ribbon that is flexible can be formed into the cable while being spirally twisted, and the MCF can be formed into a cable with a small bending radius, so that the XT can be reduced.

The MCF cable incorporating the MCF according to the present disclosure is preferably a ribbon slot type cable, and preferably includes a tension member at the center of the slot member. Accordingly, the bending radius of the MCF becomes easily controllable, and the XT can be reduced. In addition, the provision of the tension member at the center of the slot member enables the cable to be easily bent in any direction, and the cable laying work can be easily performed.

Regarding the MCF cable incorporating the MCF according to the present disclosure, a tension member is preferably provided inside a sheath without the provision of a slot member in a space inside the sheath. Accordingly, the space inside the sheath can be effectively used, and the number of cores per cross-sectional area of the MCF cable can be increased.

As described above, according to the present disclosure, it is possible to realize an MCF including 12 cores that are usable for short-haul O-band transmission, that has a standard coating diameter in an MFD almost the same as that of a general-purpose SMF or the like, that is capable of splicing fibers without either a marker or a polarity, and that includes the 12 cores usable for the counter propagation.

Next, as another example of the MCF of the present disclosure, an MCF that can suppress XT and leakage loss even at a wavelength of 1.565 μm or a wavelength of 1.625 μm and is suitable for bidirectional transmission will be described. The wavelength of 1.565 μm is the upper limit of the C-band (1.530 μm or more and 1.565 μm or less), and the wavelength of 1.625 μm is the upper limit of the L-band (1.565 μm or more and 1.625 μm or less).

Non-Patent Document 2 discloses an MCF with a small MFD to reduce inter-core crosstalk (XT) and leakage loss. However, the use of the MCF of Patent Document 2 in bidirectional transmission results in significant connection loss deterioration. Patent Document 2 discloses an MCF for short-haul transmission in the O-band (1.260 μm or more and 1.360 μm or less). However, the use of the MCF of Patent Document 2 inevitably leads to deterioration of inter-core XT in long wavelength bands such as the C-band, and such an MCF is not suitable for high-density wavelength division multiplexing transmission in the C-band and L-band. Furthermore, in Patent Document 3, the depressed type shown in FIG. 8 is adopted as the refractive index profile around each core in order to suppress inter-core XT and leakage loss. In this case, it is necessary to increase the absolute value of the relative refractive index difference of the depressed layer around each core, and manufacturability of a MCF preform is poor.

The MCF of the present disclosure has a resin coating 130 with a standard outer diameter of 250 μm±15 μm, that is, 235 μm or more and 265 μm or less, and contains 12 cores 110. Specifically, the MCF of the present disclosure includes 12 cores 110 each extending along the central axis corresponding to the fiber axis AX, a common cladding 120 covering each of the 12 cores 110, and a resin coating 130 covering the outer periphery of the common cladding 120. On the cross-section of the MCF perpendicular to the central axis, the 12 cores 110 are arranged so that there is no adjacent relationship between cores each having an adjacent relationship to a specific core selected from the 12 cores 110. Furthermore, the 12 cores 110 are arranged so that the 12 centers are line symmetrical with respect to an axis LA that intersects the central axis and passes through none of the centers of the 12 cores 110. That is, the MCF of the present disclosure has any one of the core arrangements shown in FIGS. 3 to 5. Any one of the patterns (A) to (K) shown in FIG. 8 can be applied to the refractive index profile around each core. In such a structure that only depressed layer 122 or both of the optical cladding 121 and the depressed layer 122 are provided around each core as in the pattern (F), the pattern (H), and the pattern (K), one core unit is constituted by the group of the core 110 and the depressed layer 122 associated with the core 110, or, a group of the core 110, the optical cladding 121, and the depressed layer 122. The one core unit includes one core 110, and a center of the one core unit corresponds to a center of the one core 110 included therein.

In the MCF of the present disclosure, an effective area $A_{eff,1.550}$ [μm$^2$] is 70 μm$^2$ or more at a wavelength of 1.550 μm. A cable cutoff wavelength $\lambda_{cc}$ [μm] measure on a length of 22 m is 1.530 μm or less, or, 1.460 μm or less. An outer diameter of the common cladding 120 is 143 μm or more and 195 μm or less. The center-to-center interval between the cores having the adjacent relationship is 28.5 μm or more and 40 μm or less. A shortest distance from the center of each of the 12 cores 110 to the interface between the common cladding 120 and the resin coating 130 is 26 μm or more and 35 μm or less. Parallel propagation XT between the cores having the adjacent relationship is $10^{-3}$/km or less at a wavelength of 1.565 μm. At a wavelength of 1.565 μm, leakage loss from the common cladding 120 to the resin coating 130 is 0.01 dB/km or less.

In the following description, out of the patterns (A) to (K) shown in FIG. 8, an MCF sample having a refractive index profile of one of the pattern (F), the pattern (H), and the pattern (K) in which the depressed layer 122 is provided around each core will be described. However, the following various conditions shown below can be applied to the group where no depressed layer is provided as a refractive index profile around each core, that is, the pattern (A) to the pattern (E), the pattern (G), the pattern (I), and pattern (J). Specifically, in the MCF sample in which any pattern of the group in which no depressed layer is provided is applied as a refractive index profile around each core, parameters of the depressed layer 122 described later, that is, an absolute value $\Delta_{dep}$ of a relative refractive index difference of the depressed layer 122 is set to 0%, and an inner radius b and an outer radius c of the depressed layer 122 satisfy the relationship of b=c.

Figure 16:
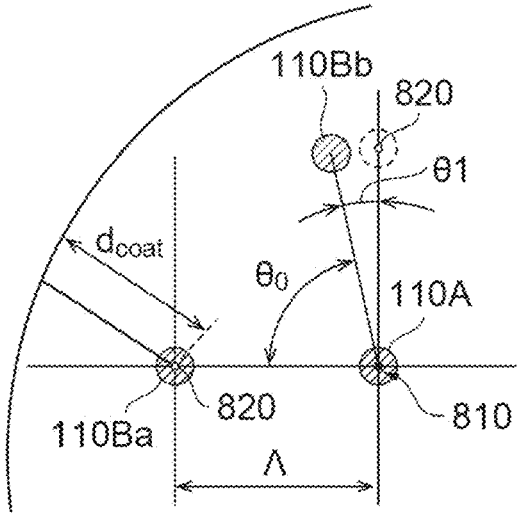
FIG. 16 is a diagram for explaining specifications of the M CF samples shown in FIG. 17.

FIG. 17 shows the specifications of Samples 1 to 4 of the embodiment according to the MCF of the present disclosure and Samples 1 to 5 of the comparative example. FIG. 16 is a diagram for explaining the specifications of the MCF samples shown in FIG. 17 (referred to as "parameter definition" in FIG. 16).

The upper part of FIG. 16 (referred to as "core arrangement" in FIG. 16) shows the positional relationship, among the 12 cores 110, between a specific core 110A centered on the lattice point 810 and the adjacent cores 110Ba, 110Bb, the adjacent cores being adjacent to the specific core 110A and have the same center-to-center interval Λ. The middle part of FIG. 16 (referred to as "Depressed type refractive index profile (patterns (F) and (H))" in FIG. 16) shows, out of the refractive index profiles shown in FIG. 8, the refractive index profile of pattern (F) and pattern (H) that is associated with the cross-sectional structure around each core shown in the second stage of FIG. 7. The lower part of FIG. 16 (denoted as "Trench-assisted type refractive index profile (pattern (K))") shows, out of the refractive index profiles shown in FIG. 8, the refractive index profile pattern of the pattern (K) that is associated with the cross-sectional structure around each core shown in the second stage of FIG. 7.

In the table of FIG. 17, each of Sample 1 to Sample 4 of the embodiment is an MCF having 12 cores 110 containing a group of the specific core 110A, the adjacent core 110Ba, and the adjacent core 110Bb that are arranged as shown in the upper part of FIG. 16, and the refractive index profile around each core is a refractive index profile of any one of the pattern (F), the pattern (H), and the pattern (K) shown in FIG. 8. In the table of FIG. 17, Sample 1 to Sample 3 of the comparative example have 12 cores 110 arranged on each lattice point of the square lattice shown in the upper part of FIG. 6. In Sample 1 of the comparative example, the refractive index profile around each core is a pattern where no depressed layer is provided. In Sample 2 to Sample 5 of the comparative example, the refractive index profile around each core is any pattern of the pattern (F), the pattern (H), and the pattern (K) shown in FIG. 8. In the table of FIG. 17, Sample 4 and Sample 5 of the comparative example, 16 cores are arranged on each lattice point of a square lattice, similar to Sample 1 to Sample 3 of the comparative example, and the refractive index profile around each core is any pattern of the pattern (F), the pattern (H), and the pattern (K) shown in FIG. 8.

Among the parameters shown in the table of FIG. 17, a [μm] is a radius of the core 110 as shown in the middle and lower parts of FIG. 16, b [μm] is an inner radius of the depressed layer 122 as shown in the middle and lower parts of FIG. 16, c [μm] is an outer radius of the depressed layer 122 as shown in the middle and lower parts of FIG. 16. $A_{\mathit{eff},1.550}$ [μm²] is an effective area at a wavelength of 1.550 μm. $\lambda_{cc}$ [μm] is a cable cutoff wavelength at 22 m-length. $\Delta_{core}$ [%] is a maximum relative refractive index difference of the core 110 with respect to the refractive index of the common cladding 120 as shown in the middle and lower parts of FIG. 16. $\Delta_{dep}$ [%] is an absolute value of a relative refractive index difference of the depressed layer 122 with respect to the refractive index of the common cladding 120 as shown in the middle and lower parts of FIG. 16. Λ [μm] is a center-to-center interval between the adjacent cores. $d_{coat}$ [μm] is a shortest distance from the core 110 to the interface between the common cladding 120 and the resin coating 130 as shown in the upper part of FIG. 16. $\theta_0$ [deg] is an index indicating a positional relationship between the specific core 110A centered on the inner lattice point 810 and the adjacent cores 110Ba, 110Bb. The adjacent core 110Ba is centered on the outer lattice point 820 and the adjacent core 110Bb is decentered from the outer lattice point 820, but both of the adjacent cores 110Ba, 110Bb are adjacent to the specific core 110A and have the same center-to-center interval Λ to the specific core 110A as shown in the upper part of FIG. 16. Furthermore, the $\theta_0$ [deg] is an angle between a line segment extending from the center of the core 110A toward the center of the core 110Ba and a line segment extending from the center of the core 110A toward the center of the core 110Bb. CD [μm] is a minimum outer diameter of the common cladding 120. "XT AT 1.565 μm" [1/km] is a parallel propagation XT between the adjacent cores at a wavelength 1.565 μm. "XT AT 1.625 μm" [1/km] is a parallel propagation XT between the adjacent cores at a wavelength 1.625 μm. "LEAKAGE LOSS AT 1.565 μm" [dB/km] is a leakage loss at the wavelength of 1.565 μm. "LEAKAGE LOSS AT 1.625 μm" [dB/km] is a leakage loss at the wavelength of 1.625 μm.

In FIGS. 3 and 6, the center-to-center intervals Λ between the adjacent cores are all set equal, but they may vary within a predetermined range from the nominal value $\Lambda_{nominal}$. In this case, manufacturing tolerance can be increased. Similarly, the minimum outer diameter CD of the common cladding 120 may also vary within a predetermined range from the nominal value $CD_{nominal}$.

In the following, "Lower limit of $A_{\mathit{eff}}$", "Desirable XT range", "Desirable center-to-center interval between adjacent cores", "Desirable $d_{coat}$" and "acceptable minimum outside diameter CD" that match each specification of Sample 1 to Sample 4 of the embodiment shown in FIG. 17 will be described below.

($A_{\mathit{eff}}$ Lower Limit)

Each core of the MCF of the present disclosure may have an effective area $A_{\mathit{eff},1.550}$ of 70 μm² or more at a wavelength of 1.550 μm. This makes it possible to suppress noise caused by nonlinear interference. Also, it is possible to suppress the connection loss caused by the axial misalignment between the MCFs of the present disclosure.

(Desirable XT Range)

In the MCF of the present disclosure, the sum of the counter propagation XT from the adjacent cores to any core should be −20 dB or less even after 10 km-propagation at a wavelength of 1.565 μm. Since the counter propagation XT from other than the adjacent cores is sufficiently low to be ignored, a sufficient signal-to-noise ratio Signal-to-Noise Rate (SNR) is realized even when performing coherent detection.

In addition, in the MCF of the present disclosure, the sum of the counter propagation XT from the adjacent cores to any core should be −40 dB or less even after 10 km-propagation in the working wavelength band. Since the counter propagation XT from other cores than the adjacent cores is sufficiently low and can be ignored, a sufficient SNR can be realized even when IM-DD (Intensity Modulation-Direct Detection) is performed.

In the MCF of the present disclosure, the parallel propagation XT between the adjacent cores should be $10^{-3}$/km or less (−30 dB or less) at a wavelength of 1.565 μm. As a result, when 12 cores are arranged in the standard square lattice core arrangement, for all pairs of adjacent cores, the sum of the counter propagation XT can be lower than $10^{-3}$/km (=−30 dB) even after propagation of a 10 km-repeater-span or link. Specifically, when 12 cores are deployed, it can be less than $7 \times 10^{-4}$/km.

Furthermore, in the MCF of the present disclosure, the parallel propagation XT between the adjacent cores is preferably 10⁻⁴/km or less (−40 dB or less) at a wavelength of 1.565 μm. As a result, when the 12 cores are arranged in the standard square lattice core arrangement, the sum of the counter propagation XT between the adjacent cores is propagated through a repeater span or link of 100 km for all pairs of adjacent cores. Even later, it can be reduced to 10⁻³/km or less (−30 dB or less). Specifically, if 12 cores are arranged, it can be less than 8×10⁻⁴/km.

(Desirable Center-to-Center Interval Between Adjacent Cores)

In order to suppress the parallel propagating XT between the adjacent cores to 10⁻³/km or less at the wavelength of 1.565 μm, it is preferable that the center-to-center interval Λ between the adjacent cores satisfies the following Formula (105):

$$\Lambda \geq \frac{6.51\frac{\sqrt{A_{\mathit{eff},1.550}/\pi}}{\lambda_{cc}} + 14.2}{1 + 0.528\Delta_{dep}\left(\frac{c-b}{a}\right)}, \quad (105)$$

where a [μm] is a radius of the core 110, b [μm] is an inner radius of the depressed layer 122, c [μm] is an outer radius of the depressed layer 122, $A_{\mathit{eff},1.550}$ [μm] is an effective area at a wavelength of 1.550 μm, $\lambda_{cc}$ [μm] is a cable cutoff wavelength at 22 m-length, $\Delta_{dep}$ [%] is an absolute value of a relative refractive index difference of the depressed layer 122 with respect to the refractive index of the common cladding 120 and is, by definition, a value of 0 or more.

Also, in order to suppress the parallel propagation XT between the adjacent cores to 10⁻⁴/km or less at the wavelength of 1.565 μm, it is preferable that the Λ satisfies the following Formula (106):

$$\Lambda \geq \frac{7.27\frac{\sqrt{A_{\mathit{eff},1.550}/\pi}}{\lambda_{cc}} + 14.4}{1 + 0.495\Delta_{dep}\left(\frac{c-b}{a}\right)}. \quad (106)$$

In order to suppress parallel propagating XT between the adjacent cores to 10⁻³/km or less at the wavelength of 1.625 μm, it is preferable that the Λ satisfies the following Formula (107):

$$\Lambda = \frac{6.97\frac{\sqrt{A_{\mathit{eff},1.550}/\pi}}{\lambda_{cc}} + 14.5}{1 + 0.601\Delta_{dep}\left(\frac{c-b}{a}\right)}. \quad (107)$$

Furthermore, in order to suppress the parallel propagating XT between the adjacent cores to 10⁻⁴/km or less at the wavelength of 1.625 μm, it is preferable that the Λ satisfies the following Formula (108):

$$\Lambda \geq \frac{7.99\frac{\sqrt{A_{\mathit{eff},1.550}/\pi}}{\lambda_{cc}} + 13.7}{1 + 0.519\Delta_{dep}\left(\frac{c-b}{a}\right)}. \quad (108)$$

(Desirable $d_{coat}$)

In order to suppress the leakage loss from the common cladding 120 to the resin coating 130 to 0.01 dB/km or less at the wavelength of 1.565 μm, it is preferable that the shortest distance $d_{coat}$ from the core center to the outer peripheral surface of the common cladding 120 satisfies the following equation (109):

$$d_{coat} \geq \frac{7.35\frac{\sqrt{A_{\mathit{eff},1.550}/\pi}}{\lambda_{cc}} + 4.60}{1 + 0.500\Delta_{dep}\ln\frac{c}{a}}. \quad (109)$$

Here, the outer peripheral surface of common cladding 120 corresponds to the interface between common cladding 120 and resin coating 130. Also, the $d_{coat}$ of the outermost core, that is, the minimum value of $d_{coat}$, is generally called the outer cladding thickness (OCT), and in this specification, the $d_{coat}$ means a value that can be defined for each core.

In order to suppress the leakage loss from the common cladding 120 to the resin coating 130 to 0.001 dB/km or less at the wavelength of 1.565 μm, it is preferable that the $d_{coat}$ satisfies the following Formula (110):

$$d_{coat} \geq \frac{8.30\frac{\sqrt{A_{\mathit{eff},1.550}/\pi}}{\lambda_{cc}} + 4.16}{1 + 0.400\Delta_{dep}\ln\frac{c}{a}}. \quad (110)$$

In order to suppress the leakage loss from the common cladding 120 to the resin coating 130 to 0.0005 dB/km or less at the wavelength of 1.565 μm, it is preferable that the $d_{coat}$ satisfies the following Formula (111):

$$d_{coat} \geq \frac{8.59\frac{\sqrt{A_{\mathit{eff},1.550}/\pi}}{\lambda_{cc}} + 3.99}{1 + 0.372\Delta_{dep}\ln\frac{c}{a}}. \quad (111)$$

On the other hand, in order to suppress the leakage loss from the common cladding 120 to the resin coating 130 to 0.01 dB/km or less at the wavelength of 1.625 μm, it is preferable that the $d_{coat}$ satisfies the following Formula (112):

$$d_{coat} \geq \frac{8.32\frac{\sqrt{A_{\mathit{eff},1.550}/\pi}}{\lambda_{cc}} + 2.30}{1 + 0.471\Delta_{dep}\ln\frac{c}{a}}. \quad (112)$$

In order to suppress the leakage loss from the common cladding 120 to the resin coating 130 to 0.001 dB/km or less at the wavelength of 1.625 μm, it is preferable that the $d_{coat}$ satisfies the following Formula (113):

$$d_{coat} \geq \frac{9.44\frac{\sqrt{A_{\mathit{eff},1.550}/\pi}}{\lambda_{cc}} + 1.47}{1 + 0.365\Delta_{dep}\ln\frac{c}{a}}. \quad (113)$$

In order to suppress the leakage loss from the common cladding 120 to the resin coating 130 to 0.0005 dB/km or less at the wavelength of 1.625 µm, is preferable that the $d_{coat}$ satisfies the following Formula (114):

$$d_{coat} \geq \frac{9.79\frac{\sqrt{A_{eff,1.550}/\pi}}{\lambda_{cc}} + 1.20}{1 + 0.335\Delta_{dep}\ln\frac{c}{a}}. \tag{114}$$

(Acceptable Minimum Outer Diameter CD)

In order to suppress the parallel propagation XT between the adjacent cores to $10^{-3}$/km or less at the wavelength of 1.565 µm and suppress the leakage loss from the common cladding 120 to the resin coating 130 to 0.01 dB/km or less, it is preferable that, in a standard square lattice core arrangement, the minimum outer diameter CD of the MCF with the 12 cores satisfies the following Formula (115):

$$CD \geq 2\left[\sqrt{1.5^2 + 0.5^2}\frac{6.51\frac{\sqrt{A_{eff}/\pi}}{\lambda_{cc}} + 14.2}{1 + 0.528\Delta_{dep}\left(\frac{c-b}{a}\right)} + \frac{7.35\frac{\sqrt{A_{eff,1.550}/\pi}}{\lambda_{cc}} + 4.60}{1 + 0.500\Delta_{dep}\ln\frac{c}{a}}\right]. \tag{115}$$

In order to suppress the parallel propagation XT between the adjacent cores to $10^{-4}$/km or less at the wavelength of 1.565 µm and suppress the leakage loss from the common cladding 120 to the resin coating 130 to 0.001 dB/km or less, it is preferable that, in a standard square lattice core arrangement, the CD of the MCF with the 12 cores satisfies the following Formula (116):

$$CD \geq 2\left[\sqrt{1.5^2 + 0.5^2}\frac{7.27\frac{\sqrt{A_{eff,1.550}/\pi}}{\lambda_{cc}} + 14.4}{1 + 0.495\Delta_{dep}\left(\frac{c-b}{a}\right)} + \right. \tag{116}$$

$$\left.\frac{8.30\frac{\sqrt{A_{eff,1.550}/\pi}}{\lambda_{cc}} + 4.16}{1 + 0.400\Delta_{dep}\ln\frac{c}{a}}\right].$$

On the other hand, in order to suppress the parallel propagation XT between the adjacent cores to $10^{-3}$/km or less at the wavelength of 1.625 µm and suppress the leakage loss from the common cladding 120 to the resin coating 130 to 0.01 dB/km or less, it is preferable that, in a standard square lattice core arrangement, the minimum outer diameter CD of the MCF with 12 cores satisfies the following Formula (117):

$$CD \geq 2\left[\sqrt{1.5^2 + 0.5^2}\frac{6.97\frac{\sqrt{A_{eff,1.550}/\pi}}{\lambda_{cc}} + 14.5}{1 + 0.601\Delta_{dep}\left(\frac{c-b}{a}\right)} + \right. \tag{117}$$

$$\left.\frac{8.32\frac{\sqrt{A_{eff,1.550}/\pi}}{\lambda_{cc}} + 2.30}{1 + 0.471\Delta_{dep}\ln\frac{c}{a}}\right].$$

In order to suppress the parallel propagation XT between the adjacent cores to $10^{-4}$/km or less at the wavelength of 1.625 µm and suppress the leakage loss from the common cladding 120 to the resin coating 130 to 0.001 dB/km or less, it is preferable that, in a standard square lattice core arrangement, the CD of the MCF with 12 cores satisfies the following Formula (118):

$$CD \geq 2\left[\sqrt{1.5^2 + 0.5^2}\frac{7.99\frac{\sqrt{A_{eff,1.550}/\pi}}{\lambda_{cc}} + 13.7}{1 + 0.519\Delta_{dep}\left(\frac{c-b}{a}\right)} + \right. \tag{118}$$

$$\left.\frac{9.44\frac{\sqrt{A_{eff,1.550}/\pi}}{\lambda_{cc}} + 1.47}{1 + 0.365\Delta_{dep}\ln\frac{c}{a}}\right].$$

Note that when the $\lambda_{cc}$ is 1.530 µm or less, single mode operation in C-band can be ensured. When the $\lambda_{cc}$ is 1.460 µm or less, single mode operation in S-band can be secured. On the other hand, in the case that the $\lambda_{cc}$ is longer than 1.260 µm, light confinement in the core can be strengthened, and then both of the counter propagation XT and the leakage loss can be reduced. In the case that the λcc is longer than 1.360 µm, the confinement of light in the core can be further strengthened, and then both of the counter propagation XT and the leakage loss can be further reduced.

The $\Delta_{dep}$ is preferably 0.5% or less. By reducing the absolute value of the relative refractive index difference between the depressed layer 122 and the common cladding 120, it is possible to improve the manufacturability of the MCF preform. The $\Delta_{dep}$ may be 0.35% or less. The manufacturability of the MCF preform can be further improved. The most preferable range of the $\Delta_{dep}$ is 0.20% or less.

In the MCF cable capable of incorporating the MCF of the present disclosure, the upper limit of the average bending radius of the mounted MCF should be 0.60 m or less, and more preferably 0.30 m or less. This condition is effective in reducing the counter propagation XT. Moreover, the lower limit of the average bending radius of the mounted MCF should be 0.06 m or more, and more preferably 0.10 m or more. This condition is effective in reducing the bending fracture probability of MCF in the cable.

The MCF cable that can incorporate the MCF of the present disclosure may be a ribbon slot type cable. In this case, the bend radius of the MCF can be easily controlled, and XT can be reduced.

The MCF cable that can incorporate the MCF of the present disclosure may be an intermittent adhesive ribbon type cable. An intermittently bonded ribbon is a ribbon in which adjacent MCFs among a plurality of MCFs constituting the ribbon are bonded together at regular intervals along the longitudinal direction. In this case, the flexible intermittent adhesive ribbon can be helically twisted and mounted within the cable. That is, XT can be effectively reduced by cabling while imparting a small bend radius to the MCF.

What is claimed is:

1. A multi-core optical fiber, comprising:

12 core units each including a core extending along a central axis of the multi-core optical fiber, and a depressed layer covering an outer periphery of the core as viewed from a cross-section of the multi-core optical fiber and having a refractive index lower than a maximum refractive index of the core, the cross-section being perpendicular to the central axis;

a common cladding covering an outer periphery of each of the 12 core units as viewed from the cross-section and having a refractive index higher than that of the depressed layer; and a resin coating covering an outer periphery of the common cladding as viewed from the cross-section;

wherein on the cross-section, the 12 core units are arranged so that no adjacent relationship is established between cores each having an adjacent relationship with a specific core selected from the 12 core units, and are arranged so that centers of the 12 core units are line symmetric with a symmetry axis, the symmetry axis intersecting the central axis and passing through none of the centers of the 12 core units, the adjacent relationship being defined as a relationship between two cores having a center-to-center interval that a difference from a minimum center-to-center interval is 2 μm or less, an outer diameter of the resin coating is 250±15 μm, an effective area $A_{eff,1.550}$ [μm$^2$] is 70 μm$^2$ or more at a wavelength of 1.550 μm, a cable cutoff wavelength $\lambda_{cc}$ [μm] at 22 m-length falls within one of a range of 1.530 μm or less and a range of 1.460 μm or less, a center-to-center interval $\Lambda$ [μm] between cores having the adjacent relationship satisfies the following Formula (1):

$$\Lambda \geq \frac{6.51 \frac{\sqrt{A_{eff,1.550}/\pi}}{\lambda_{cc}} + 14.2}{1 + 0.528\Delta_{dep}\left(\frac{c-b}{a}\right)}, \quad (1)$$

where a [μm] is a radius of the core in each of the 12 core units, b [μm] is an inner radius of the depressed layer, c [μm] is an outer radius of the depressed layer, and $\Delta_{dep}$ [%] is an absolute value of a relative refractive index difference of the depressed layer with respect to the refractive index of the common cladding, a shortest distance $d_{coat}$ [μm] from a center of the core in each of the 12 core units to an interface between the common cladding and the resin coating satisfies the following Formula (2):

$$d_{coat} \geq \frac{7.35 \frac{\sqrt{A_{eff,1.550}/\pi}}{\lambda_{cc}} + 4.60}{1 + 0.500\Delta_{dep}\ln\frac{c}{a}}, \quad (2)$$

and a minimum outer diameter CD of the common cladding falls within one of a range of 185 μm or less, a range of 190 μm or less, and a range 195 μm or less, and further satisfies the following Formula (3):

$$CD \geq 2\left[\sqrt{1.5^2 + 0.5^2} \frac{6.51 \frac{\sqrt{A_{eff,1.550}/\pi}}{\lambda_{cc}} + 14.2}{1 + 0.528\Delta_{dep}\left(\frac{c-b}{a}\right)} + \frac{7.35 \frac{\sqrt{A_{eff,1.550}/\pi}}{\lambda_{cc}} + 4.60}{1 + 0.500\Delta_{dep}\ln\frac{c}{a}}\right]. \quad (3)$$

2. The multi-core optical fiber according to claim 1, wherein the center-to-center interval $\Lambda$ satisfies the following Formula (4):

$$\Lambda \geq \frac{7.27 \frac{\sqrt{A_{eff,1.550}/\pi}}{\lambda_{cc}} + 14.4}{1 + 0.495\Delta_{dep}\left(\frac{c-b}{a}\right)}, \quad (4)$$

the shortest distance $d_{coat}$ satisfies the following Formula (5):

$$d_{coat} \geq \frac{8.30 \frac{\sqrt{A_{eff,1.550}/\pi}}{\lambda_{cc}} + 4.16}{1 + 0.400\Delta_{dep}\ln\frac{c}{a}}, \quad (5)$$

and the minimum outer diameter CD of the common cladding satisfies the following Formula (6):

$$CD \geq 2\left[\sqrt{1.5^2 + 0.5^2} \frac{7.27 \frac{\sqrt{A_{eff,1.550}/\pi}}{\lambda_{cc}} + 14.4}{1 + 0.495\Delta_{dep}\left(\frac{c-b}{a}\right)} + \frac{8.30 \frac{\sqrt{A_{eff,1.550}/\pi}}{\lambda_{cc}} + 4.16}{1 + 0.400\Delta_{dep}\ln\frac{c}{a}}\right]. \quad (6)$$

3. The multi-core optical fiber according to claim 1, wherein the center-to-center interval $\Lambda$ satisfies the following Formula (7):

$$\Lambda \geq \frac{6.97 \frac{\sqrt{A_{eff,1.550}/\pi}}{\lambda_{cc}} + 14.5}{1 + 0.601\Delta_{dep}\left(\frac{c-b}{a}\right)}, \quad (7)$$

the shortest distance $d_{coat}$ satisfies the following Formula (8):

$$d_{coat} \geq \frac{8.32\frac{\sqrt{A_{eff,1550}/\pi}}{\lambda_{cc}} + 2.30}{1 + 0.471\Delta_{dep}\ln\frac{c}{a}}, \tag{8}$$

and
the minimum outer diameter CD of the common cladding satisfies the following Formula (9):

$$CD \geq 2\left[\sqrt{1.5^2 + 0.5^2}\,\frac{6.97\frac{\sqrt{A_{eff,1550}/\pi}}{\lambda_{cc}} + 14.5}{1 + 0.601\Delta_{dop}\left(\frac{c-b}{a}\right)} + \frac{8.32\frac{\sqrt{A_{eff,1550}/\pi}}{\lambda_{cc}} + 2.30}{1 + 0.471\Delta_{dep}\ln\frac{c}{a}}\right]. \tag{9}$$

4. The multi-core optical fiber according to claim 1, wherein
the center-to-center interval Λ satisfies the following Formula (10):

$$\Lambda \geq \frac{7.99\frac{\sqrt{A_{eff,1550}/\pi}}{\lambda_{cc}} + 13.7}{1 + 0.519\Delta_{dep}\left(\frac{c-b}{a}\right)}, \tag{10}$$

the shortest distance $d_{coat}$ satisfies the following Formula (11):

$$d_{coat} \geq \frac{9.44\frac{\sqrt{A_{eff,1550}/\pi}}{\lambda_{cc}} + 1.47}{1 + 0.365\Delta_{dep}\ln\frac{c}{a}}, \tag{11}$$

and
the minimum outer diameter CD of the common cladding satisfies the following Formula (12):

$$CD \geq 2\left[\sqrt{1.5^2 + 0.5^2}\,\frac{7.99\frac{\sqrt{A_{eff,1550}/\pi}}{\lambda_{cc}} + 13.7}{1 + 0.519\Delta_{dep}\left(\frac{c-b}{a}\right)} + \right. \tag{12}$$

$$\left. \frac{9.44\frac{\sqrt{A_{eff,1550}/\pi}}{\lambda_{cc}} + 1.47}{1 + 0.365\Delta_{dep}\ln\frac{c}{a}}\right].$$

5. The multi-core optical fiber according to claim 1, wherein
the $\Delta_{dep}$ falls within one of a range of 0.5% or less and a range of 0.35% or less.

6. A multi-core optical fiber cable in which the multi-core optical fiber according to claim 1 is mounted with an average bending radius of 0.06 m or more and 0.6 m or less.

7. A multi-core optical fiber, comprising:
12 cores each including a core extending along a central axis of the multi-core optical fiber;
a common cladding covering an outer periphery of each of the 12 cores as viewed from a cross-section of the multi-core optical fiber, the cross-section being perpendicular to the central axis; and
a resin coating covering an outer periphery of the common cladding as viewed from the cross-section;
wherein
on the cross-section, the 12 cores are arranged so that no adjacent relationship is established between cores each having an adjacent relationship with a specific core selected from the 12 cores, and are arranged so that centers of the 12 cores are line symmetric with a symmetry axis, the symmetry axis intersecting the central axis and passing through none of the centers of the 12 cores, the adjacent relationship being defined as a relationship between two cores having a center-to-center interval that a difference from a minimum center-to-center interval is 2 μm or less,
an outer diameter of the resin coating is 250±15 μm,
an effective area $A_{eff,1550}$ [μm$^2$] is 70 μm$^2$ or more at a wavelength of 1.550 μm,
a cable cutoff wavelength $\lambda_{cc}$ [μm] at 22 m-length falls within one of a range of 1.530 μm or less and a range of 1.460 μm or less,
an outer diameter of the common cladding is 143 μm or more and 195 μm or less,
a center-to-center interval between cores having the adjacent relationship is 28.5 μm or more and 40 μm or less,
a shortest distance from a center of the core to an interface between the common cladding and the resin coating is 26 μm or more and 35 μm or less,
a parallel propagation crosstalk between the cores having the adjacent relationship is 10$^{-3}$/km or less, at a wavelength of 1.565 μm, and
a leakage loss from the common cladding to the resin coating is 0.01 dB/km or less, at the wavelength of 1.565 μm.

8. A multi-core optical fiber cable in which the multi-core optical fiber according to claim 7 is mounted with an average bending radius of 0.06 m or more and 0.6 m or less.

\* \* \* \* \*